US008689242B2

(12) United States Patent
Nagashima

(10) Patent No.: US 8,689,242 B2
(45) Date of Patent: Apr. 1, 2014

(54) INFORMATION PROCESSING APPARATUS FOR CONTROLLING INSTALLATION, METHOD FOR CONTROLLING THE APPARATUS AND CONTROL PROGRAM FOR EXECUTING THE METHOD

(75) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1433 days.

(21) Appl. No.: 11/837,812

(22) Filed: Aug. 13, 2007

(65) Prior Publication Data

US 2008/0201714 A1    Aug. 21, 2008

(30) Foreign Application Priority Data

Feb. 16, 2007  (JP) ................................ 2007-036113

(51) Int. Cl.
*G06F 9/44* (2006.01)
(52) U.S. Cl.
USPC ........... 719/327; 717/172; 717/177; 715/739; 718/102
(58) Field of Classification Search
None
See application file for complete search history.

(56) References Cited

U.S. PATENT DOCUMENTS

| 5,580,177 | A  | * | 12/1996 | Gase et al. ........................ 400/61 |
| 5,692,111 | A  | * | 11/1997 | Marbry et al. ................ 358/1.15 |
| 6,009,274 | A  | * | 12/1999 | Fletcher et al. ................ 717/173 |
| 6,138,153 | A  | * | 10/2000 | Collins et al. ................. 709/221 |
| 6,542,892 | B1 | * | 4/2003  | Cantwell ............................... 1/1 |
| 7,895,609 | B2 | * | 2/2011  | Inoue ............................. 719/327 |
| 2001/0029551 | A1 | * | 10/2001 | Higuchi ........................ 709/321 |
| 2002/0065873 | A1 | * | 5/2002  | Ishizuka ........................ 709/203 |
| 2002/0083131 | A1 | * | 6/2002  | Machida ........................ 709/203 |
| 2002/0083431 | A1 | * | 6/2002  | Machida ........................ 717/174 |
| 2002/0100036 | A1 | * | 7/2002  | Moshir et al. .................. 717/173 |
| 2003/0120624 | A1 | * | 6/2003  | Poppenga et al. ................. 707/1 |
| 2003/0200289 | A1 | * | 10/2003 | Kemp et al. .................... 709/221 |
| 2003/0200292 | A1 | * | 10/2003 | Kemp et al. .................... 709/222 |
| 2004/0015959 | A1 | * | 1/2004  | Kobayashi ..................... 717/174 |
| 2004/0057072 | A1 | * | 3/2004  | Borchers et al. ............. 358/1.15 |
| 2005/0012951 | A1 | * | 1/2005  | Madril et al. ................. 358/1.13 |
| 2005/0210060 | A1 | * | 9/2005  | Borchers ........................ 707/102 |
| 2005/0273863 | A1 | * | 12/2005 | Nakao et al. .................... 726/26 |
| 2006/0122848 | A1 |   | 6/2006  | Takagi |
| 2006/0221372 | A1 | * | 10/2006 | Onishi et al. ................. 358/1.13 |
| 2006/0248522 | A1 | * | 11/2006 | Lakshminarayanan et al. ............................. 717/174 |
| 2007/0285704 | A1 | * | 12/2007 | Wu ............................. 358/1.15 |

FOREIGN PATENT DOCUMENTS

JP          2004-171513          6/2004

* cited by examiner

*Primary Examiner* — Emerson Puente
*Assistant Examiner* — Paul Mills
(74) *Attorney, Agent, or Firm* — Fitzpatrick, Cella, Harper & Scinto

(57) ABSTRACT

A server apparatus manages a device driver for enabling any of a plurality of devices to which a plurality of client apparatuses are connected on a network. The server apparatus comprises a storage unit that stores, for each device, a device driver that can be installed to the device in association with the device, a generating unit that generates different tasks for any of the stored device drivers, a creating unit that creates a schedule for executing the generated tasks, and an executing unit that executes the generated tasks based on the created schedule.

13 Claims, 27 Drawing Sheets

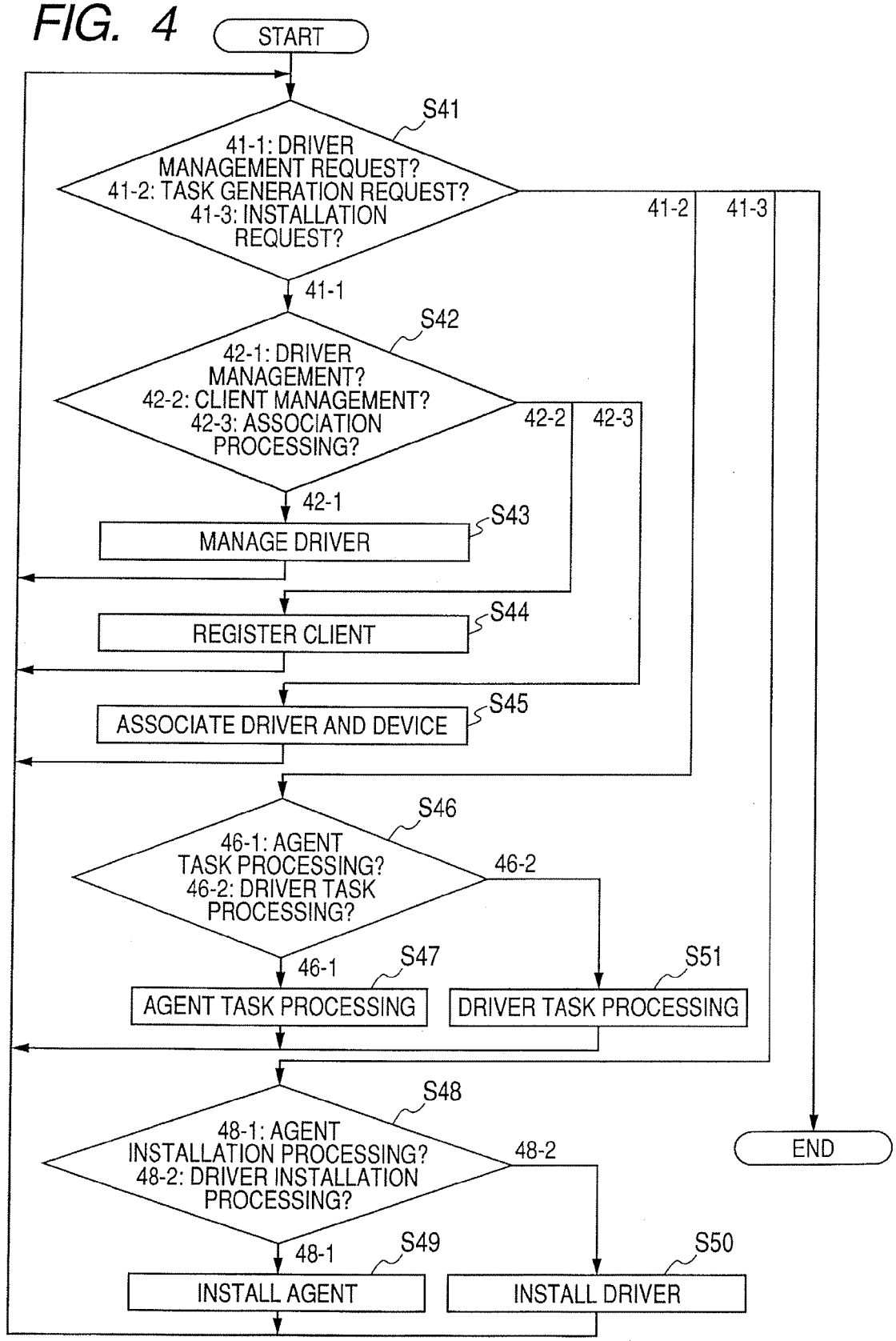

FIG. 5

| | Network | Network Name |
|---|---|---|
| | Domain | domain01 |
| | Domain | domain01 |
| | Workgroup | Workgroup01 |
| | Workgroup | Workgroup01 |

C5, C6

| IP Address | aaa.bbb.ccc.001 | aaa.bbb.ccc.002 | aaa.bbb.ddd.001 |
|---|---|---|---|
| Language | US | JP | US |
| misc | | FAX | FAX |
| PDL | PS | PS | PCL5e |
| Device Name | Device-A | Device-A | Device-B |

C8, C9, C11, C10, C7

C1

| Client Name | | | |
|---|---|---|---|
| ClientPC_01 | Use | Use | Use |
| ClientPC_02 | No Use | Use | No Use |
| ClientPC_03 | Use | No Use | No Use |
| ClientPC_04 | No Use | Use | No Use |

PC_01, C12

| Driver Name | PS Driver-A | PS Driver-A | PCL Driver-A |
|---|---|---|---|
| W2K | US: v12.00 | US: v12.00 JP: v10.00 | US: v5.00 |
| W9x | | JP: v10.00 | |

| Driver Name | | FAX Driver-A | FAX Driver-A |
|---|---|---|---|
| W2K | | US: v3.00 JP: v3.00 | US: v3.00 |

| Driver Name | | | |
|---|---|---|---|
| W9x | | JP: v3.00 | |

| Area | OS | Language |
|---|---|---|
| 1F-area11 | W2K | US |
| 1F-area11 | W2K | JP |
| 1F-area11 | W2K | US |
| 1F-area11 | W9x | JP |

| | Select | # | PDL | Version | OS | Language |
|---|---|---|---|---|---|---|
| SCB1 | ■ | 001 | PS | v12.00 | W2K | US |
| SCB2 | ■ | 002 | PS | v12.00 | W9x | US |
| SCB3 | ■ | 003 | PS | v10.00 | W2K | JP |
| SCB4 | ■ | 004 | PS | v10.00 | W9x | JP |
| SCB5 | ■ | 005 | PCL5e | v5.00 | W2K | US |
| SCB6 | ■ | 006 | PCL5e | v3.00 | W9x | US |
| SCB7 | ■ | 009 | FAX | v3.00 | W2K | US |
| SCB8 | ■ | 010 | FAX | v3.00 | W9x | US |
| SCB9 | ■ | 011 | FAX | v3.00 | W2K | JP |
| SCB10 | ■ | 012 | FAX | v3.00 | W9x | JP |

Specify Driver Set

Driver Set: [EBOX] [Browse BT81] [Register BT82] [Cancel BT83]

Driver Set Information

FIG. 9

| Correspondence information between devices and drivers | |
|---|---|
| [File A]  91 | 92 |

| Device Name | Printer Name |
|---|---|
| Device-A | PS Device-A Driver |
| Device-B | PS Device-B Driver |
| : | : |

[File B]

| Device Name | Printer Name |
|---|---|
| Device-A | PCL5e Device-A Driver |
| Device-B | PCL5e Device-B Driver |
| : | : |

[File C]

| Device Name | Printer Name |
|---|---|
| Device-A | FAX Device-A Driver |
| Device-B | FAX Device-B Driver |
| : | : |

FIG. 10

Driver Database

* Driver Set
  - US
    - PS
      - W2K
        - v12.00
      - W9x
        - v12.00
    - PCL5e
      - W2K
        - v5.00
      - W9x
        - v3.00
    - FAX
      - W2K
        - v3.00
      - W9x
        - v3.00
  - JP
    - PS
      - W2K
        - v12.00
      - W9x
        - v12.00
    - FAX
      - W2K
        - v3.00
      - W9x
        - v3.00

Driver Set

[Add] [Delete] [Cancel]

| Select | PDL | Version | OS | Language |
|---|---|---|---|---|
| ☐ | PS | v12.00 | W2K | US |
| ☐ | PS | v12.00 | W9x | US |
| ☐ | PS | v10.00 | W2K | JP |
| ☐ | PS | v10.00 | W9x | JP |
| ☐ | PCL5e | v5.00 | W2K | US |
| ☐ | PCL5e | v3.00 | W9x | US |
| ☐ | FAX | v3.00 | W2K | US |
| ☐ | FAX | v3.00 | W9x | US |
| ☐ | FAX | v3.00 | W2K | JP |
| ☐ | FAX | v3.00 | W9x | JP |

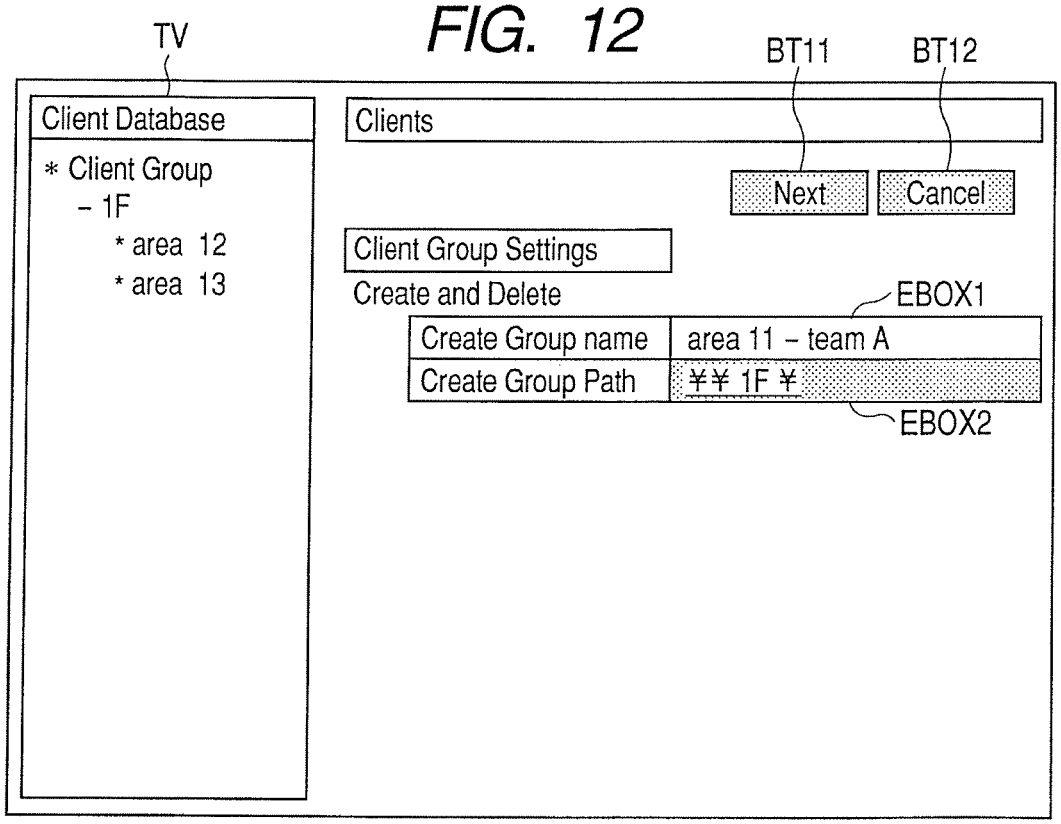
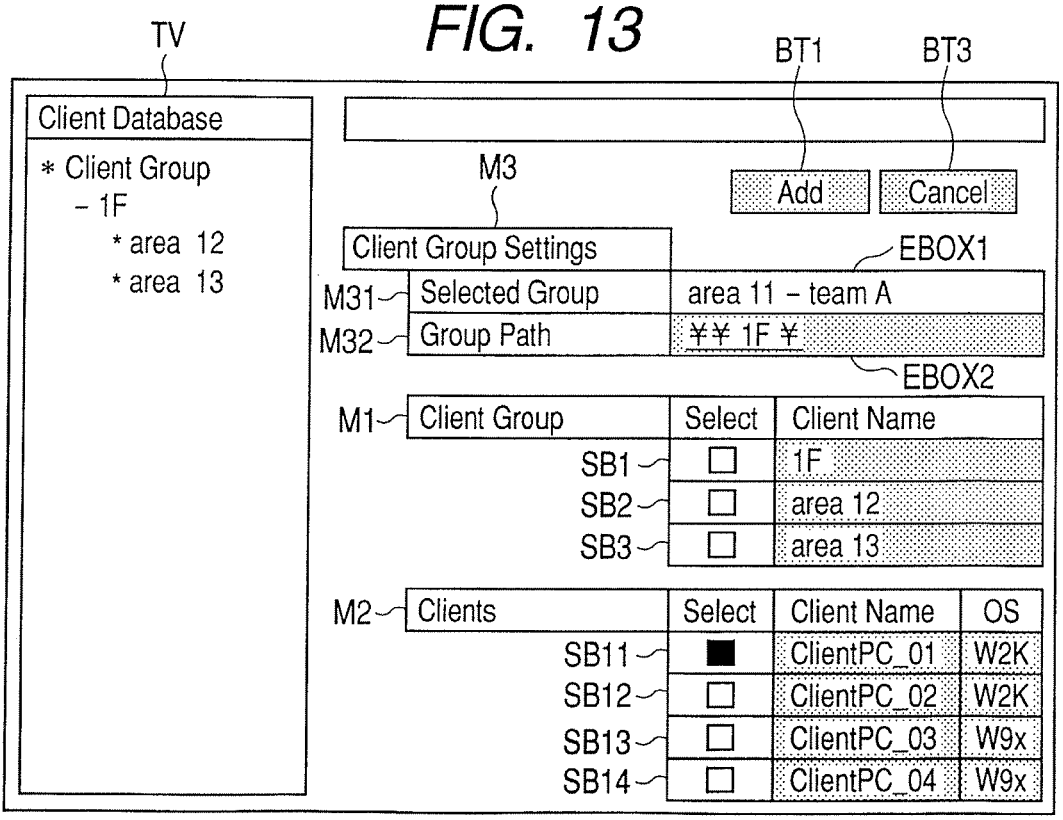

FIG. 15

| Client PC | | | | | | | |
|---|---|---|---|---|---|---|---|
| Select | Computer Name | OS | Network | Domain/WorkGroup | ID | Password | Status |
| ☐ | ClientPC_01 | W2K | Domain | domain01 | ALL | Saved | |
| ☐ | ClientPC_02 | W2K | Domain | domain01 | ALL | Saved | |
| ☐ | ClientPC_03 | W2K | WorkGroup | WorkGroup01 | | | |
| ☐ | ClientPC_04 | W2K | WorkGroup | WorkGroup01 | | | |
| | | | | | | | |
| | | | | | | | |
| | | | | | | | |
| | | | | | | | |
| | | | | | | | |
| | | | | | | | |

C151  C152  C153  C154  C155  C156  C157 BT11  C158 BT12

Next   Cancel

FIG. 16

Enter ID/Password

BT11 Next | BT12 Cancel

SC1 [Domain]

| Domain | ID | Password |
|---|---|---|
| domain01 | All | ******** |
|  |  |  |

SC161 / SC162 / SC163

SC2 [Workgroup Members]

SC164

| Client Name | OS | WorkGroup | ID | Password |
|---|---|---|---|---|
| ClientPC_03 | W9x | Workgroup_01 |  |  |
| ClientPC_04 | W2K | Workgroup_01 |  |  |
|  |  |  |  |  |
|  |  |  |  |  |
|  |  |  |  |  |
|  |  |  |  |  |

Registration to Scheduler

BT171 Register | BT172 Cancel

SC3 [Task Registration Settings]

| Task Name | Agent Installation 001 | |
|---|---|---|
| Schedule | ☐ Immediate execution | |
|  | ■ Execution at specific date | 2005/1/1 13:00:00 |
|  | ☐ Only registration | |

C171, C172, S1, S2, S3

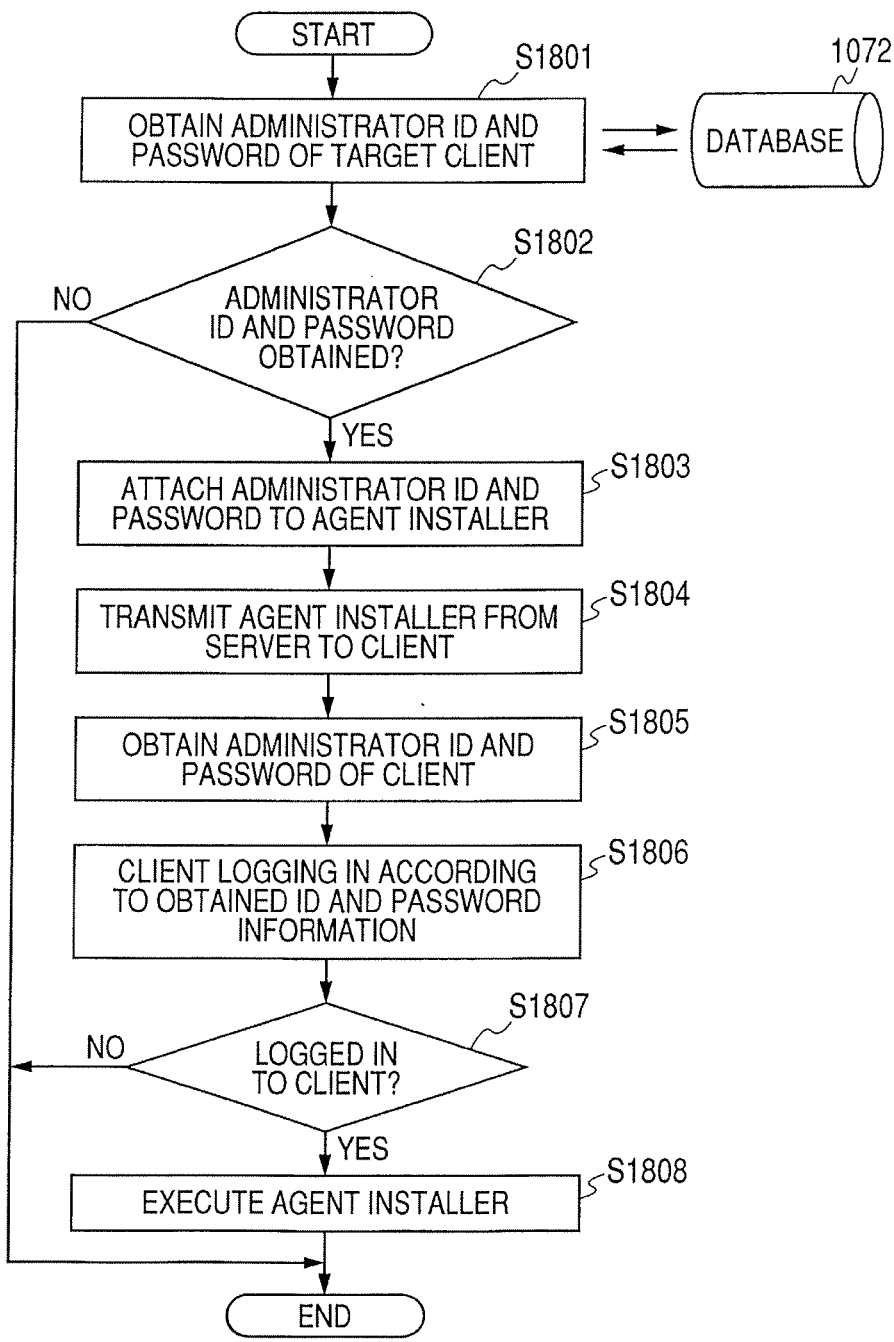

FIG. 20

| | | | | | | | |
|---|---|---|---|---|---|---|---|
| Device | | | | | | | |
| | C2002 | C2003 | C2004 | C2005 | C2006 | C2007 | |
| Select | Device Name | IP Address | Location | PDL | Language | misc | |
| ■ | Device-A | aaa.bbb.ccc.001 | area 11 | PS | English | FAX | |
| ☐ | Device-A | aaa.bbb.ccc.002 | area 11 | PS | Japanese | FAX | |
| .. | .. | .. | .. | PCL5e | English | .. | |
| .. | .. | .. | .. | .. | .. | .. | |
| .. | .. | .. | .. | .. | .. | .. | |
| .. | .. | .. | .. | .. | .. | .. | |
| .. | .. | .. | .. | .. | .. | .. | |
| .. | .. | .. | .. | .. | .. | .. | |
| ☐ | Device-n | aaa.bbb.ccc.nnn | area xx | nnn | mmm | mmm | |

C2001 — Select column
SC201

Buttons: Next (BT11), Cancel (BT12)

Device Group (TV):
* Device Group
  - F1
    * area 11
    * area 12
    * area 13
  - F2
    * area 21
    * area 22

FIG. 21

Available Drivers                                    C2105 BT11  C2106 BT12
                                                     [Next]      [Cancel]

| Select (C2101) | Driver Name (C2102) | PDL (C2103) | Version (C2104) | OS | Language |
|---|---|---|---|---|---|
| ■ | PS Driver-A | PS | v12.00 | W2K | US |
| ■ | PS Driver-A | PS | v12.00 | W9x | US |
| ☐ | PS Driver-A | PS | v10.00 | W2K | JP |
| ☐ | PS Driver-A | PS | v10.00 | W9x | JP |
| ☐ | PCL Driver-A | PS | v5.00 | W2K | US |
| ☐ | PCL Driver-A | PS | v3.00 | W9x | US |
| ☐ | FAX Driver-A | PS | v3.00 | W2K | US |
| ☐ | FAX Driver-A | PS | v3.00 | W9x | US |
| ☐ | FAX Driver-A | PS | v3.00 | W2K | JP |
| ☐ | FAX Driver-A | PS | v3.00 | W9x | JP |
| ⋮ | ⋮ | ⋮ | ⋮ | ⋮ | ⋮ |
| ☐ | Driver-A | PDL n | v##.## | nnn | mmm |

FIG. 22

Association                                          BT221       BT222
                                                     [Register]  [Cancel]

| C2201 | |
|---|---|
| Association Name | Device-A_PS_v1200_W2K/W9x_US |
| Target Device Name | Device-A |
| Driver to Use | Device-A_PS_Driver |

Device Database

* Device Group
  - F1
    * area 11
    * area 12
    * area 13
  - F2
    * area 21
    * area 22

Association Information — SC231

| Association Name C2301 | Device Name C2302 | PDL C2303 | OS C2304 | Language C2305 | misc C2306 |
|---|---|---|---|---|---|
| Device-A_PS_v1200_W2K/W9x_US | Device-A | PS | W2K/W9x | US | |
| Device-A_PS_v1000_W2K_JP | Device-A | PS | W2K/W9x | US | |
| Device-A_FAX_v300_W2K_JP | Device-A | | W2K/W9x | US | FAX |
| Device-B_PCL5e_v500_W2K/W9x_US | Device-B | PCL5e | W2K/W9x | US | |
| Device-B_FAX_v300_W2K_US | Device-B | | | US | FAX |
| .. | .. | .. | .. | .. | .. |
| .. | .. | .. | .. | .. | .. |
| .. | .. | .. | .. | .. | .. |
| .. | .. | .. | .. | .. | .. |
| .. | .. | .. | .. | .. | .. |
| nnnnnnn | Device-n | nnn | nnn | nnn | nnn |

FIG. 26

Driver Database
* Device Group
  * ALL Devices
  * Non-Grouped Devices
  - Devices Group
    - F1
    * area 11 – teamA
    * area 11 – teamB
    * area 11 – teamC
    * area 12
    * area 13

SC261

Association Information

C2601  C2602  C2603  BT261 C2604  BT262 C2605  C2606  C2607

[Delete] [OK]

| Select | Association_Name | Device Name | PDL | OS | Language | misc |
|---|---|---|---|---|---|---|
| ■ | Device-A_PS_v1200_W2K/W9x_US | Device-A | PS | W2K/W9x | US | |
| ■ | Device-A_PS_v1000_W2K_JP | Device-A | PS | W2K | JP | |
| ■ | Device-A_FAX_v300_W2K_JP | Device-A | | W9x | JP | FAX |
| ■ | Device-B_PCL5e_v500_W2K/W9x_US | Device-B | PCL5e | W2K/W9x | US | |
| | Device-B_FAX_v300_W2K_US | Device-B | | W2K | US | FAX |

FIG. 30

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEPS OF<br>FLOWCHART IN FIG. 4 |
| SECOND DATA PROCESSING PROGRAM<br>PROGRAM CODE GROUP CORRESPONDING TO STEPS OF<br>FLOWCHART IN FIG. 7 |
| THIRD DATA PROCESSING PROGRAM<br>PROGRAM CODE GROUP CORRESPONDING TO STEPS OF<br>FLOWCHART IN FIG. 11 |
| FOURTH DATA PROCESSING PROGRAM<br>PROGRAM CODE GROUP CORRESPONDING TO STEPS OF<br>FLOWCHART IN FIG. 14 |
| FIFTH DATA PROCESSING PROGRAM<br>PROGRAM CODE GROUP CORRESPONDING TO STEPS OF<br>FLOWCHART IN FIG. 18 |
| SIXTH DATA PROCESSING PROGRAM<br>PROGRAM CODE GROUP CORRESPONDING TO STEPS OF<br>FLOWCHART IN FIG. 19 |
| SEVENTH DATA PROCESSING PROGRAM<br>PROGRAM CODE GROUP CORRESPONDING TO STEPS OF<br>FLOWCHART IN FIG. 24 |
| EIGHTH DATA PROCESSING PROGRAM<br>PROGRAM CODE GROUP CORRESPONDING TO STEPS OF<br>FLOWCHART IN FIG. 28 |

MEMORY MAP OF STORAGE MEDIUM

INFORMATION PROCESSING APPARATUS FOR CONTROLLING INSTALLATION, METHOD FOR CONTROLLING THE APPARATUS AND CONTROL PROGRAM FOR EXECUTING THE METHOD

BACKGROUND OF THE INVENTION

1. Field of the Invention

The present invention relates to a network system that connects a plurality of client apparatus and devices via a network.

2. Description of the Related Art

As network systems have been installed in more and more businesses, the numbers of computers and multifunction image forming apparatuses, or multifunction peripherals (MFP), have been increasing. As these numbers are increasing, the document solution business for reducing TCO by efficient management of the numbers is performed with many applications.

Under that circumstance, it has been required to manage a printer driver, installed in a computer (PC), for printing data generated by application.

In response to the requirement, multiple systems have been developed as a system for easily installing a recommended driver, i.e., "Push installing" a recommended driver, from a server to a client.

In case of installing a driver corresponding to a device from a server to a client, a system of installing by specifying a driver corresponding to a targeted device is known as a first system.

A system of generating a driver priority list from a driver profile (model number, OS version and language) and a resource profile (available driver information) and obtaining an appropriate driver set according to the generated driver priority list and installing the driver is known as a second system.

A system of specifying a range for searching for a network device to connect with a network on the network, searching for the network device in the specified range, and then broadcasting a control program to the client that manages the network device in the searched range (Japanese Patent Application Laid-Open No. 2004-171513) is known as a third system.

SUMMARY OF THE INVENTION

According to the present invention, a server apparatus is provided that manages a device driver for enabling any of a plurality of devices to which a plurality of client apparatuses are connected on a network, comprising a storage unit that stores, for each device, a device driver that can be installed to the device in association with the device, a generating unit that generates different tasks for any of the stored device drivers, a creating unit that creates a schedule for executing the generated tasks, and an executing unit that executes the generated tasks based on the created schedule.

Other features and advantageous of the present invention will be apparent from the following description taken in conjunction with the accompanying drawings, in which like reference characters designate the same or similar parts throughout there of.

BRIEF DESCRIPTION OF THE DRAWINGS

FIG. 4 is a flowchart illustrating an example of a first data processing procedure in the server apparatus illustrating the embodiment.

FIG. 5 is a diagram illustrating an example of a driver install information list scheduled in the server illustrating the embodiment.

FIG. 8 is a diagram illustrating an example of a user interface screen displayed on the second display unit illustrated in FIG. 2.

FIG. 9 is a diagram illustrating an example of driver sets to be registered at the server apparatus illustrating the embodiment.

FIG. 10 is a diagram illustrating an example of a screen for displaying a list of registered driver databases that is displayed on the second display unit illustrated in FIG. 2.

FIG. 12 is a diagram illustrating an example of a user interface screen displayed on the second display unit illustrated in FIG. 2.

FIG. 13 is a diagram illustrating an example of the user interface screen displayed on the second display unit illustrated in FIG. 2.

FIG. 15 is a diagram illustrating an example of a user interface screen displayed on the second displayed unit illustrated in FIG. 2.

FIG. 16 is a diagram illustrating an example of the user interface screen displayed on the second display unit illustrated in FIG. 2.

FIG. 17 is a diagram illustrating an example of the user interface screen displayed on the second display unit illustrated in FIG. 2.

FIG. 18 is a flowchart illustrating an example of a fifth data processing procedure in the server apparatus illustrating the embodiment.

FIG. 20 is a diagram illustrating an example of a user interface screen displayed on the second display unit illustrated in FIG. 2.

FIG. 21 is a diagram illustrating an example of a user interface screen displayed on the second display unit illustrated in FIG. 2.

FIG. 22 is a diagram illustrating an example of a user interface screen displayed on the second display unit illustrated in FIG. 2.

FIG. 23 is a diagram illustrating an example of a user interface screen displayed on the second display unit illustrated in FIG. 2.

FIG. 26 is a diagram illustrating an example of a user interface screen displayed on the second display unit illustrated in FIG. 2.

FIG. 30 is a diagram describing a memory map of a storage medium that stores various data processing programs which can be read by the information processing unit according to the present invention.

DESCRIPTION OF THE EMBODIMENTS

Now, exemplary embodiments for implementing the present invention will be described with reference to the drawings.

<Description of System Configuration>

[First Embodiment]

Figure 1:
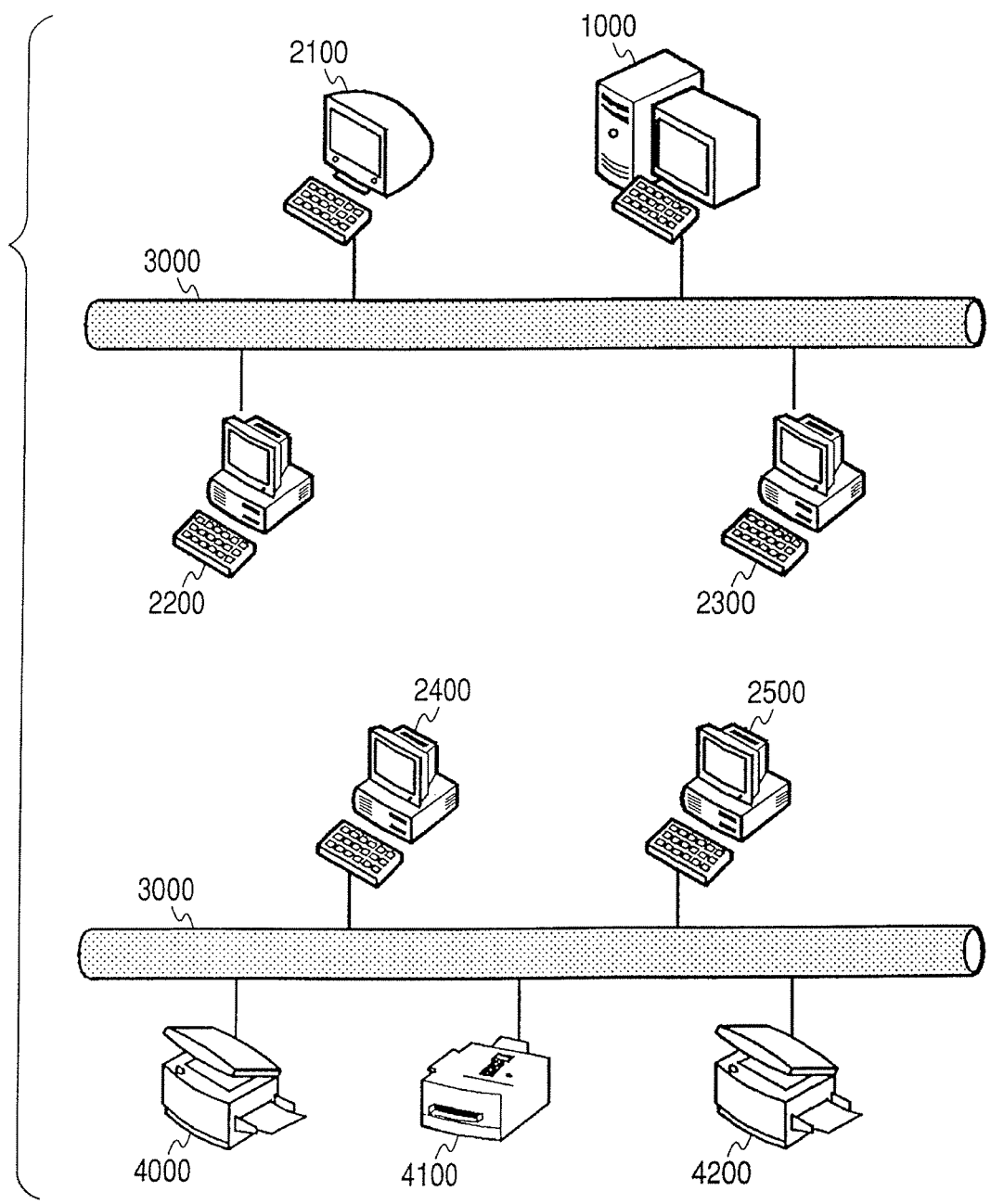
FIG. 1 is a diagram describing arrangement of a network system including an information processing unit, server apparatus, an image forming device illustrating a first embodiment of the present invention.

FIG. 1 is a diagram describing arrangement of a network system including an information processing unit, server apparatus, an image forming device illustrating a first embodiment of the present invention. This embodiment is an exemplary network system in which a server, a client computer (client) and an image forming device (device) can communicate over a network.

FIG. 1 illustrates a communication circuit 3000 that is made up with network cables of the Ethernet (registered trademark), for example. To the communication circuit 3000, a sever computer (server) 1000, clients 2100, 2200, 2300, 2400 and 2500 are connected via a network controller.

To the communication circuit 3000, devices that can print 4000, 4100, 4200 are further connected from each client. The devices 4000, 4100 and 4200 may include a printer device with a simple function or a multifunction image forming apparatus, or multifunction peripheral (MFP), for executing multiple functions.

To the clients 2100, 2200, 2300, 2400, 2500 and the server 1000, a printer driver for sending a printing job to each device is installed. The printer driver is installed in a storage unit provided for the clients 2100, 2200, 2300, 2400, 2500 and the server 1000, and loaded by a CPU to a RAM under management of an operating system (OS). In addition to the printer driver, a facsimile driver for executing facsimile transmission or the like via a network is included in the device driver.

Each printer driver corresponding to a version of an OS or the like may be provided from a vender, and the version may be changed as the function is expanded. The device driver is a control program provided by a manufacturer of the device. As the control program is installed to a client, the corresponding device becomes available. The device driver has a unique user interface and a function for displaying setting to the device and the state of the device to a user.

In the network system with such configuration, it is assumed that the client 2100 among the clients is used by an administrator to access the server 1000.

On the other hand, to the clients 2200, 2300, 2400 and 2500, an Agent is installed from the server 1000. The printer driver is installed from the server 1000 for printing from the available peripheral devices 4000, 4100, 4200 via the communication circuit 3000.

[Configuration of Printing System]

Figure 2:
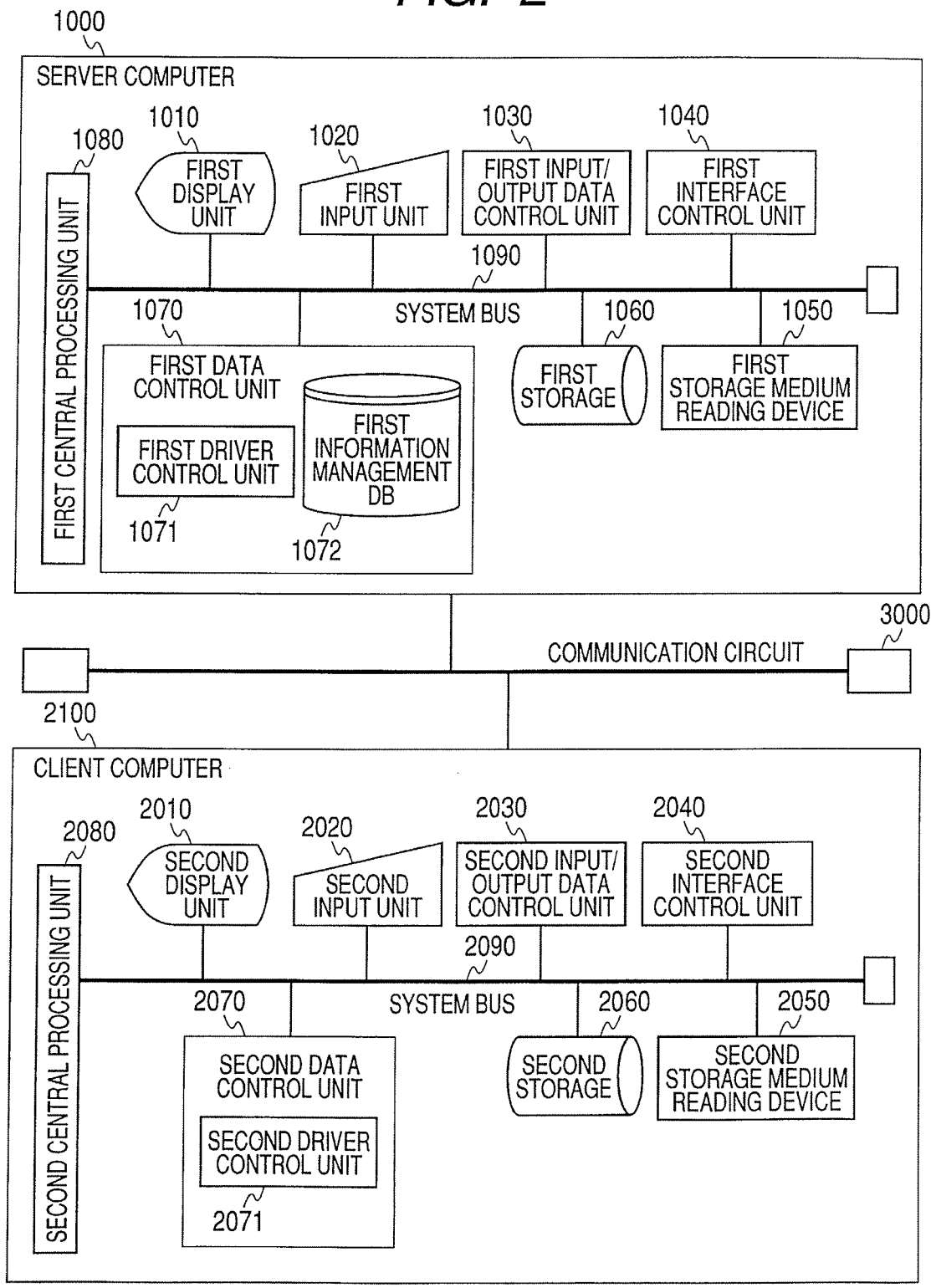
FIG. 2 is a block diagram describing hardware configuration of the server and the clients illustrated in FIG. 1.

FIG. 2 is a block diagram describing hardware configuration of the server 1000 and the clients 2100, 2200, 2300, 2400 and 2500 illustrated in FIG. 1.

FIG. 2 will be described with the client 2100 representing all the clients. The example is an example in which the server 1000 and the client computer 2100 are connected via the communication circuit 3000.

The client 2100 will be described for driver installation in the case in which the client 2100 is used by an administrator who performs driver processing on the server 1000. That is, the clients 2200, 2300, 2400 and 2500 other than the client 2100 function as a client to which the driver is to be installed.

The server 1000 illustrated in FIG. 2 shows a first central processing unit 1080 that is made up with a CPU for loading an OS, a control program and an application program stored in a first storage 1060 to a RAM or the like and executes them. The first storage 1060 is made up with an external storage unit like a hard disk.

To the first storage 1060, a program and related data are stored via a first storage medium reading device 1050. Here, media readable by the first storage medium reading device 1050 include a flexible disk (FD), a CD-ROM and an IC memory card and store a program and related data.

A first data control unit 1070 includes a first driver control unit 1071 for loading a system program and an application program to a RAM, for example, and executing the program and a first information management database (first information management DB) 1072. The first information management DB 1072 manages a device driver relating to the devices 4000, 4100, 4200 that are connected via the communication circuit 3000. The first driver control unit 1071 executes the installation of the device drivers for the clients 2200, 2300, 2400 and 2500 based on the control procedure illustrated in FIG. 4.

The first data control unit 1070 processes information input from a first input unit 1020 and outputs the information to a peripheral device such as a printer, which is connected with the server 1000 via a first interface control unit 1040.

In the embodiment, it is assumed that a first display unit 1010 is a display device such as a CRT display and a liquid crystal display, and the first input unit 1020 is made up with a pointing device like a keyboard and a mouse. A system bus 1090 connects each of the above-mentioned parts and the first central processing unit 1080. A first input/output data control unit 1030 controls to process input from the first input unit 1020 and display the result on the first display unit 1010. The first input/output data control unit 1030 writes data and a program read out from the first storage medium reading device 1050 into the second storage 2060 and also reads data and a program stored in the second storage 2060.

The first storage 1060 and the second storage 2060 may be made up with a hard disk and a magneto optical disk, or may be made up with a combination thereof.

The communication circuit 3000 is a general LAN or a two-way serial interface such as IEEE 1394 or USB.

The client 2100 illustrated in FIG. 2 includes a second central processing unit 2080 that is made up with a CPU and a second storage 2060 that is made up with an external storage unit like a hard disk.

To the second storage 2060, a program and related data are stored via a second storage medium reading device 2050. Here, media readable by the second storage medium reading device 2050 include a flexible disk (FD), a CD-ROM and an IC memory card and store a program and related data.

A second input/output data control unit 2030 controls to process input from the second input unit 2020 and display the result on the second display unit 2010. The second input/output data control unit 2030 writes data and a program read out from the second storage medium reading device 2050 into the second storage 2060 and also reads data and a program stored in the second storage 2060.

A second data control unit 2070 has a second driver control unit 2071 for loading a system program and an application program to the RAM, for example, and executing the program.

The second data control unit 2070 processes information input from the second input unit 2020 and outputs the information to a peripheral device such as a printer, which is connected with the client 2100 via a second interface control unit 2040. A system bus 2090 connects each of the above-mentioned parts and the second central processing unit 2080.

In the embodiment, it is assumed that the second display unit 2010 is a display device such as a CRT display and a liquid crystal display, and the second input unit 2020 is made up with a pointing device like a keyboard and a mouse.

The second storage 2060 may be made up with a hard disk and a magneto optical disk, or may be made up with a combination thereof.

The communication circuit 3000 is a general LAN or a two-way serial interface such as IEEE 1394 or USB.

Figure 3:
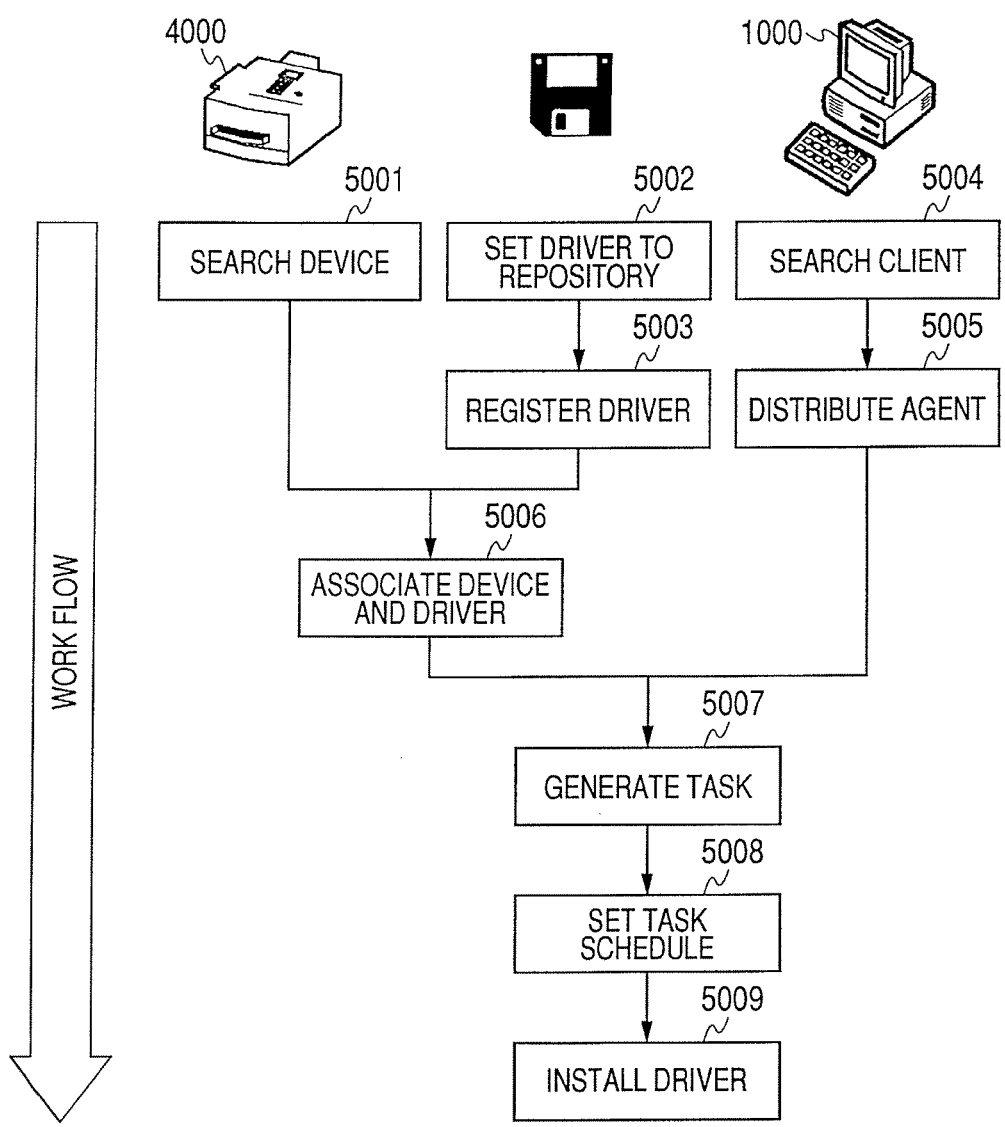
FIG. 3 is a conceptual diagram describing a workflow of installing a driver in the network system illustrated in FIG. 1.

FIG. 3 is a conceptual diagram describing a workflow of installing a driver in the network system illustrated in FIG. 1. The example corresponds a workflow up to installing a printer driver from the server 1000 to the clients 2200 and the like based on an instruction from the client 2100. The reference numerals 5001 to 5009 denote respective part of the processing.

First, as driver manage processing, a driver to be installed is set to a repository managed by the server 1000 in a server-client environment as illustrated in FIG. 2 at a process 5002. Then at a process 5003, a driver for using the device is registered.

On the other hand, at a process 5005, grouping processing is exchanged between the client that is to install the driver and the server 1000, according to a client searching result from the server 1000 executed at a process 5004. For that purpose, an Agent corresponding to the second driver control unit 2071 in the client 2000 illustrated in FIG. 1 is distributed.

Next, at a process 5006, a device searching result from the server 1000 connected with the communication circuit 3000 executed at the process 5001 and a driver previously registered at the process 5003 are associated with each other.

Next, at a process 5007, a task is generated at the server 1000 from the information on the association between a device and a driver, and a client to which an Agent is distributed, and at a process 5008, scheduling is set for the tasks.

Finally, at a process 5009, the driver is installed from the server 1000 to the client according to the set schedule. The driver installation processing has finished. That mentioned is a series of driver installation processing.

The task includes an Agent install task for installing an Agent to a client and a device driver install task for installing a printer driver, which is a device driver, to the client.

FIG. 4 is a flowchart illustrating an example of a first data processing procedure in the server apparatus illustrating the embodiment. The example is exemplary processing for the client 2100, which is a PC for an administrator, to access the server 1000 and install a driver. Here, the driver is described by taking a printer driver as an example, assuming a printer. Specifically, the processing is for the second display unit 2010 and the second input unit 2020 of the client 2100 of the PC for an administrator illustrated in FIG. 1 to access the first driver control unit 1071 of the server 1000 via Web application. Then, the processing is executed by the first driver control unit 1071 of the server 100.

Each of the reference codes S41 to S51 denotes each step. Each step can be implemented as the CPU of the client 2100, which is a PC for an administrator, loads a control program to the RAM and executes the program.

In the embodiment, the first driver control unit 1071 of the server 1000 is accessed by the second display unit 2010 and the second input unit 2020 of the client 2100 illustrated in FIG. 1, which is a PC for an administrator.

Here in the embodiment, the term 'to access the first driver control unit 1071' means to access the Web application.

Otherwise, the application may be accessed by the first display unit 1010 and the first input unit 1020 of the server 1000.

The first driver control unit 1071 instead of the Web application may communicate with the second driver control units 2071 of the clients 2200, 2300, 2400 and 2500. In such a case, a general Native application may perform instead.

First at S41, the first driver control unit 1071 of the server 1000 determines the request based on input processing from the prior second display unit 2010 and the second input unit 2020. The request to be determined is any of a driver management request (41-1), a task generation request (41-2), and an installation request of a driver or an Agent (41-3). If it is determined that none of the requests is matched, the processing ends.

If the first driver control unit 1071 determines that the request is an installation request of an Agent (41-3), S46, S48 or the present processing ends.

If the first driver control unit 1071 determines that the request is a driver management request (41-1), determination is made on which of driver manage processing 42-1, client manage processing 42-2 and associate processing 42-3 the driver management request is.

If it is determined that the request from the client 2100 is the driver manage processing 42-1, driver manage processing, which means registration or deletion of a driver set (to be detailed later) is performed at S43, and the operation returns to S41.

If the first driver control unit 1071 determines that the request from the client 2100 is the client manage processing 42-2 at S42, the operation proceeds to S44. Then at S44, the first driver control unit 1071 performs client manage processing, which means grouping or deletion of the client, in which an Agent is installed, (to be detailed later), and the operation returns to S41.

If the first driver control unit 1071 determines that the request is an associate processing 42-3 between a device and a driver at S42, associate processing between the driver and the device (to be detailed later) is performed at S45, and the operation returns to S41.

If the first driver control unit 1071 determines that the request is the task generation request 41-2 at S41, the operation proceeds to S46. Then at S46, the first driver control unit 1071 determines which of Agent task processing 46-1 and driver task processing 46-2 the task generation request is.

Here, the Agent task processing 46-1 means the processing to generate an Agent install task to a client and schedule the task.

The driver task processing 46-2 means the processing to generate a driver installation task from grouped client information and association information and schedule the task.

If the first driver control unit 1071 determines that the task generation request is the Agent task processing 46-1, the first driver control unit 1071 performs the Agent task processing (to be detailed later) at S47, and the operation returns to S41. The Agent install task is the task for installing an Agent unit, which functions as an Agent for executing a task, to a client (an Agent install task) in response to a request from the server 1000.

If the first driver control unit 1071 determines that the task generation request is the driver task processing S46-2 at S46, it performs the driver task processing (to be detailed later) at S51, and the operation returns to S41.

If the first driver control unit 1071 determines that a request from the client 2100 is the installation request 41-3 at S41, the operation proceeds to S48.

Then at S48, the first driver control unit 1071 determines whether the request type is the installation processing 48-1 or the driver installation processing 48-2 of an Agent.

The installation processing 48-1 of an Agent means a request for installing a driver or an Agent. The driver installation processing 48-2 means the driver installation processing for reading a driver selected by the server 1000 for a client from the first storage 1060, transferring and installing the drive.

If the first driver control unit 1071 determines that the request type is the installation processing 48-1 of an Agent, the first driver control unit 1071 performs the Agent installation processing on the client (to be detailed later) at S49, and the operation returns to S41. Here, the client is the clients 2100, 2200, 2300, 2400, 2500 connected with the communication circuit 3000.

If the first driver control unit 1071 determines that the request type is the driver installation processing 48-2 at S48, the operation proceeds to S50. Then at S50, the first driver control unit 1071 performs the driver installation processing by performing the task created for a client (to be detailed later) based on a schedule for which the scheduler is set, and the operation returns to S41. Processing at each step illustrated in FIG. 4 will be described with reference to a user interface and a flowchart below.

In the embodiment, it is assumed that a device or a client is searched for in advance or can be searched for in advance by such a method of Broadcast or file-reading based on a communication function of a network.

FIG. 5 is a diagram illustrating an example of a driver install information list scheduled in the server 1000 illustrating the embodiment. The screen can be displayed on the second display unit 2010 of the client 2100 as the client 2100 obtains the screen from the server 1000 via the Web application.

As illustrated in FIG. 5, the target client is <ClientPC_01>, <ClientPC_02>, <ClientPC_03> and <ClientPC_04> illustrated in [Client Name] column C1.

The place for each client to be set is <1F-area11> as illustrated in [Area] column C2.

The still mounted operating systems (hereinafter referred to as the OSs) are such as Windows (registered trademark) 2000 and Windows (registered trademark) 9x as referred to in the Windows illustrated in the [OS] column C3.

In FIG. 5, Windows (registered trademark) 2000 is expressed as <W2K> and Windows (registered trademark) 9x is expressed as <W9x>.

It is a matter of course that when Linux (product name) or Mac (product name) is used as the OS, a corresponding value that means each OS is set.

The classification depends on a print sub-system owned by the OS. From the viewpoint of a driver, it means that different drivers are present.

Windows (registered trademark) are largely divided into a driver adopted to 95/98/Me in Windows (registered trademark), a driver adopted to Windows (registered trademark) NT4, and a driver adopted to Windows (registered trademark) 2000/XP/2003.

It is a matter of course that different OS may require different driver even for the same device.

Now, [Language] column C4 is a column indicating a destination of the OS. In FIG. 5, <US> means that an OS destined to English is installed and <JP> means that an OS destined to Japanese is installed.

It is a matter of course that a corresponding driver set may differ according to destination.

As an example illustrating that each client is the type present in [Network] column C5, a domain environment and a work group environment are illustrated, with respective name illustrated in [Network Name] column C6.

In the embodiment, it means to install a driver matching three models in total of two kinds of devices <Device-A> (two units) and <Device-B> (one unit) as illustrated in [Device Name] column C7 as illustrated in FIG. 5 to such a client.

Here, [Device Name] means to be largely divided according to MIB (Management Information Base) information owned by a device.

In the case of <Device-A>, the places for respective client to be set differ even if the places have the same [Device Name]. As a result, if the places have the same [Device Name], a client recognizes that the places are different devices according to the difference of the IP address, the installed PDL, a destination owned by the device, or an option.

In FIG. 5, the IP address is illustrated in [IP Address] column C8, the destination owned by the device is illustrated in [Language] column C9, the installed PDL is illustrated in [PDL] column C10, and the option owned by the device is illustrated in [misc] column C11.

<US> in [Language] column C4 means to be the device destined to English, and <JP> means to be the device destined to Japanese.

<PS> illustrated in [PDL] column C10 means that the page description language is PostScript developed by Adobe. <PCL 5e> means to be the page description language for controlling a page printer for a personal computer developed by Hewlett-Packard.

Further, <FAX> in [misc] column C11 means that a copy can be facsimiled from a client via a device. In other words, <FAX> means that a copy can be facsimiled from a client to the device via a device as the facsimile driver for executing a FAX function is installed to the client.

Those mentioned above indicate that the device characteristics illustrated in each column of [Device Name], [Language], [PDL], [misc] in FIG. 5 may be different drivers.

A driver described in [Driver Name] column C12 is an example of a driver that corresponds to a device and that becomes effective when it is installed to a client.

In the example, version for W2K destined to US of the driver <PCL Driver-A> is installed to the client <ClientPC_01> for the device <Device-B>.

The example also intends to install version 3.00 for W2K destined to US of the driver <FAX Driver-A> for the device <Device-B>.

That is, the embodiment illustrates which device and which driver are to be installed to each client can be set by <Use> and <No Use> illustrated in FIG. 5. Here, Use means setting for installing a predetermined driver to the client, while No Use means setting for not installing a predetermined driver to the client.

Figure 6:
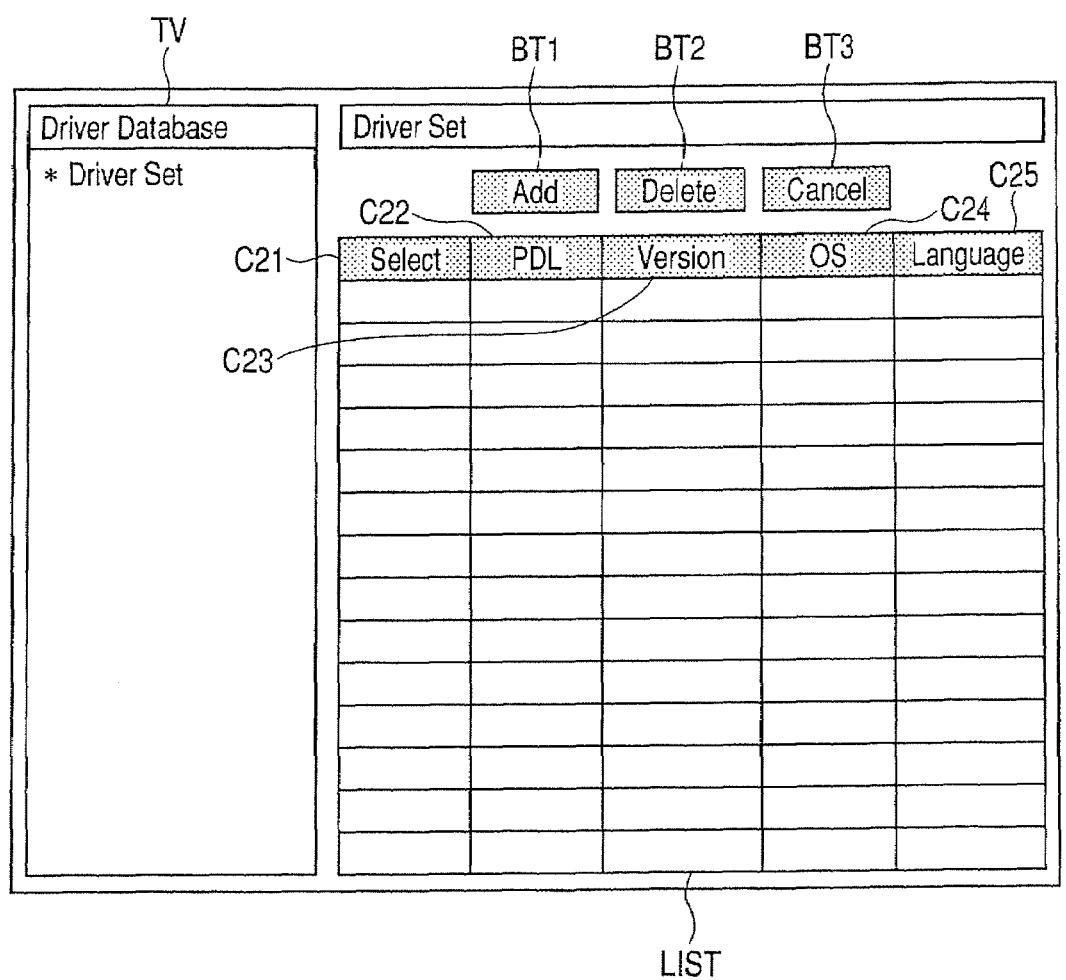
FIG. 6 is a diagram illustrating an example of a screen for displaying a list of driver databases displayed on a second display unit illustrated in FIG. 2.

FIG. 6 is a diagram illustrating an example of a screen for displaying a list of driver databases displayed on the second display unit 2010 illustrated in FIG. 2. The screen is adapted to be able to be displayed on the second display unit 2010 of the client 2100 when the client 2100 obtains the Web information from the server 1000 via the Web application.

The screen is made up with two panes and displayed on the second display unit 2010 based on the control of the second central processing unit 2080 in response to an operation on the second input unit 2020. Each column and each button will be described below.

In FIG. 6, [Driver Database] tree view TV in the left pane displays driver sets registered in the first information management DB 1072 in a tree form. In the right pane, [Driver Set] is set. If a tree is selected in the [Driver Database] tree view TV, the driver set belonging to the tree is displayed.

[Select] column C21 is a column meaning the presence of selection of a driver set. [PDL] column C22 is a column indicating PDL of the driver set.

[Version] column C23 is a column indicating the version of the driver set. [OS] column C24 is a column indicating an OS corresponding to the driver set. [Language] column C25 is a column indicating a destination to which the driver set corresponds.

[Add] button BT1 is a control button for transferring to UI for additional processing on the driver set. [Delete] button BT2 is a control button for deleting a driver set selected by [Select] button BT1.

[Cancel] button BT3 is a control button for invalidating the processing on the screen and moving to a predetermined UI.

Here, it is a matter of course that data other than PDL, Version, OS, Language can be used for determining the driver set.

Now, the driver management-registration and deletion of the driver set will be detailed.

[Driver Management-Registration and Deletion of the Driver Set]

Figure 7:
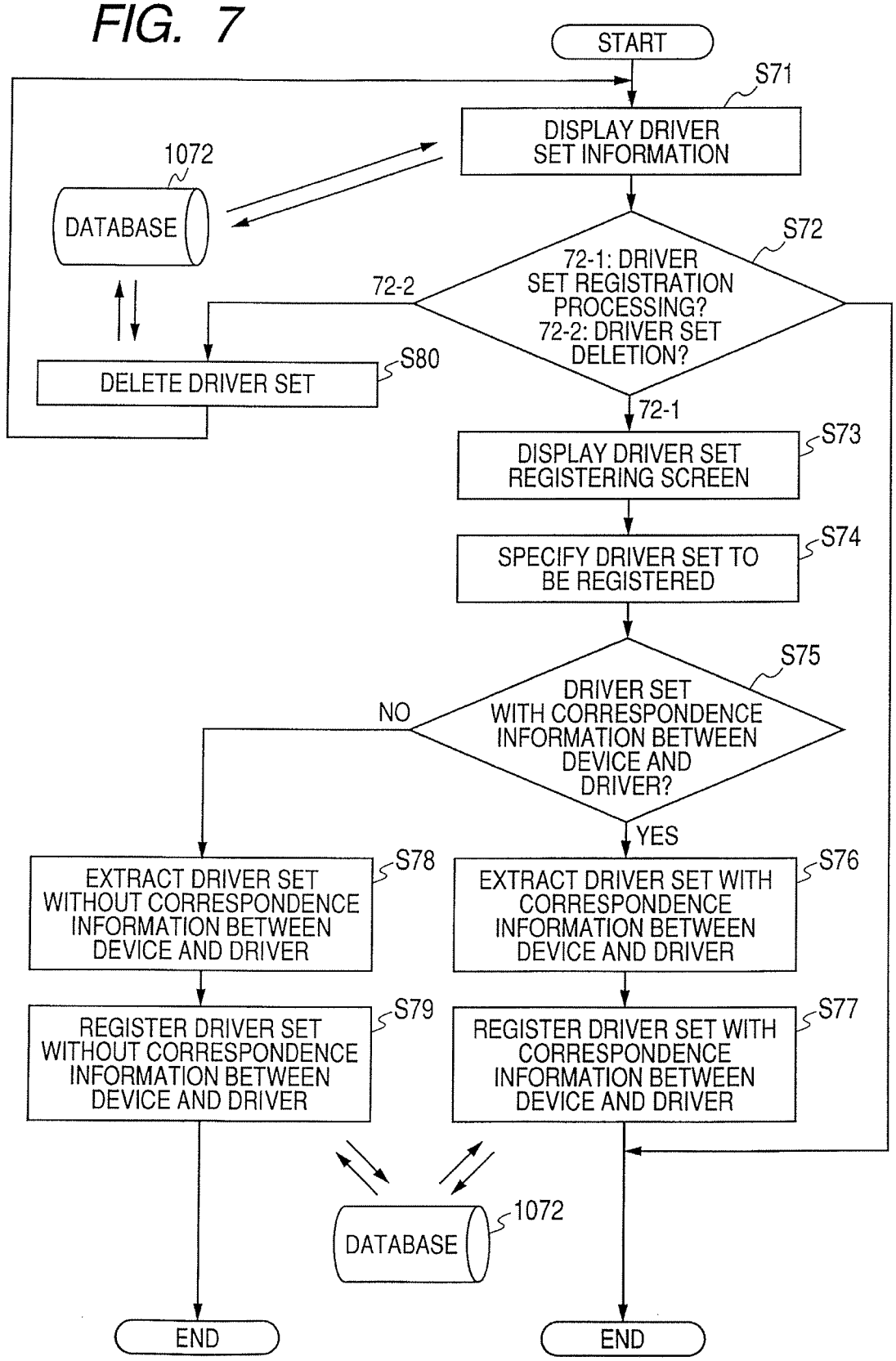
FIG. 7 is a flowchart illustrating an example of a second data processing procedure in server apparatus illustrating the embodiment.

FIG. 7 is a flowchart illustrating an example of a second data processing procedure in server apparatus illustrating the embodiment. The example corresponds to the detailed procedure of the driver management at S43 illustrated in FIG. 4. Each of the reference codes S71 to S80 denotes each step. Each step can be implemented as the CPU of the client 2100, which is a PC for an administrator, loads a control program to the RAM and executes the program.

First at S71, the first driver control unit 1071 accesses the first information management DB 1072 and displays a screen for displaying the list registered in database, for example, the list of the driver database illustrated in FIG. 6, for example, on the second display unit 2010.

Then at S72, the first driver control unit 1071 determines whether the instruction input by the administrator operating on the first input unit 1020 is driver set register processing 72-1 or driver set delete processing 72-2, or any other processing.

Consider the case in which the first driver control unit 1071 determines that the instruction is the driver set register processing 72-1. In this example, [Add] button BT1 illustrated in FIG. 6 corresponds to the driver set register processing.

According to that operation, at S73, the first central processing unit 1080 displays the driver set registering screen illustrated in FIG. 8, for example, on the second display unit 2010.

FIG. 8 is a diagram illustrating an example of a user interface screen displayed on the second display unit 2010 illustrated in FIG. 2. In the example, the screen is an example of the driver set registering screen. The screen is adapted to be able to be displayed on the second display unit 2010 of the client 2100 as the client 2100 obtains the screen from the server 1000 via the Web application.

Next at S74, the name of the driver set to be registered is directly input and specified from the second input unit 2020 into an edit box EBOX titled [Driver Set:] on the screen illustrated in FIG. 8.

It can also be adapted to allow the driver set to be registered as a general common dialog is displayed on the second display unit 2010 in response to pressing down of [Browse] button BT81 illustrated in FIG. 8. Note that BT83 is a cancel button.

Next at S75, the first driver control unit 1071 determines whether the specified driver set has information on association between the devices and the drivers or not. If the first driver control unit 1071 determines that the driver set has the information on association between the devices and the drivers, the operation proceeds to S76.

If the first driver control unit 1071 determines that the driver set does not have the information on association between the devices and the drivers, the operation proceeds to S78.

The information on association of the drivers will be described below with reference to FIG. 9.

FIG. 9 is a diagram illustrating an example of driver sets to be registered at the server apparatus illustrating the embodiment. This is an example of information on association between the devices and the device drivers. The information on association between the devices and the drivers in the embodiment is made up with 91 device names and 92 driver names.

As the ratio between a driver and a device is generally 1:1 or 1:multiple number in the embodiment, a driver available for a device needs to be identified.

The information, however, may and may not be identified from an INF file, which is an installation file for drivers.

The INF file is a system definition file in Windows (registered trademark), in which installation setting for software is described.

When the information is relatively easy to be identified like in such a case as the device name is included in the driver name, the information on association between the devices and the drivers as illustrated in the embodiment is not required. When the driver name does not include the device name or when the same driver is available to a plurality of devices with different device names, however, the information is hard to be identified.

In the embodiment, the information on association between the devices and the drivers is described in a file in advance in the data structure illustrated in FIG. 9.

It is assumed that the association between the devices and the drivers can be implemented as the information on association is read in along with the driver set.

The ways other than the association table may be used for regularizing the association rule in advance and reflecting the regularized rule on the driver names, describing the rule in the INF file, or using the regularized rule in naming a fixed driver file name.

As illustrated in FIG. 9, 'File A' is the information on association between devices and drivers for the PS driver in the embodiment. The device name 91 'Device-A' is corresponding to the PS driver set 'PS Device-A Driver'.

Similarly, the device name 91 'Device-B' is corresponding to the PS driver set 'PS Device-B Driver'.

Then at S76, processing of extracting driver set with association information between devices and drivers is performed. The extract processing means that the specified driver set and the information on association between the devices and the drivers illustrated in FIG. 9 are processed at the first driver control unit 1071.

Then at S77, the driver set with the association information between devices and drivers extracted by the first driver control unit 1071 is registered at the first information management DB 1072, and the operation ends.

In the example, the driver sets whose [Select] check buttons SCB 1 to 10 as illustrated in FIG. 8 are checked are registered as [Register] button BT82 is pressed down. An example of the result of the operation is illustrated in FIG. 10.

FIG. 10 is a diagram illustrating an example of a screen for displaying a list of registered driver databases that is displayed on the second display unit 2010 illustrated in FIG. 2. The screen is made up with two panes. The screen is adapted to be able to be displayed on the second display unit 2010 of the client 2100 when the client 2100 obtains the Web information from the server 1000 via the Web application.

Specifically, the screen is displayed on the second display unit 2010 based on the control of the second central processing unit 2080 according to the operation on the second input unit 2020. The same components as those illustrated in FIG. 6 are denoted by the same reference numerals.

In the example, a state in which ten driver sets (corresponding to the number of driver sets whose [Select] check buttons SCB 1 to 10 illustrated in FIG. 8 are checked) are registered is illustrated as an example.

On the other hand, if the first driver control unit 1071 determines that the drive set is a driver set without association information between devices and drivers, processing for extracting a driver set without corresponding information between devices and drivers is performed at S78.

Then at S79, the driver set without association information between devices and drivers is registered at the first information management DB 1072 with the same operation, and the operation ends.

That enables the embodiment to correspond to regularizing the association rule in advance and reflecting the regularized rule on the driver names, describing the rule in the INF file, or using the regularized rule in naming a fixed driver file name. It is a matter of course that the association information can be recognized in advance in the first driver control unit 1071.

It is also a matter of course that all the specified drivers can be processed without being associated with devices.

Consider the case in which the first driver control unit 1071 determines that the instruction is the driver set delete processing, i.e., a driver is Selected and [Delete] button BT2 is pressed down in FIG. 6, FIG. 8 to FIG. 10. In that case, the first driver control unit 1071 deletes the specified driver set from the first information management DB 1072, and the operation returns to S71.

If the first driver control unit 1071 determines that it is the processing other than the register processing and the delete processing of the driver set at S71, for example, it is determined that [Cancel] buttons BT3, BT83 in FIG. 6, FIG. 8 and FIG. 10 are pressed down and the operation ends.

[Client Register Processing-Client Grouping Processing]

Figure 11:
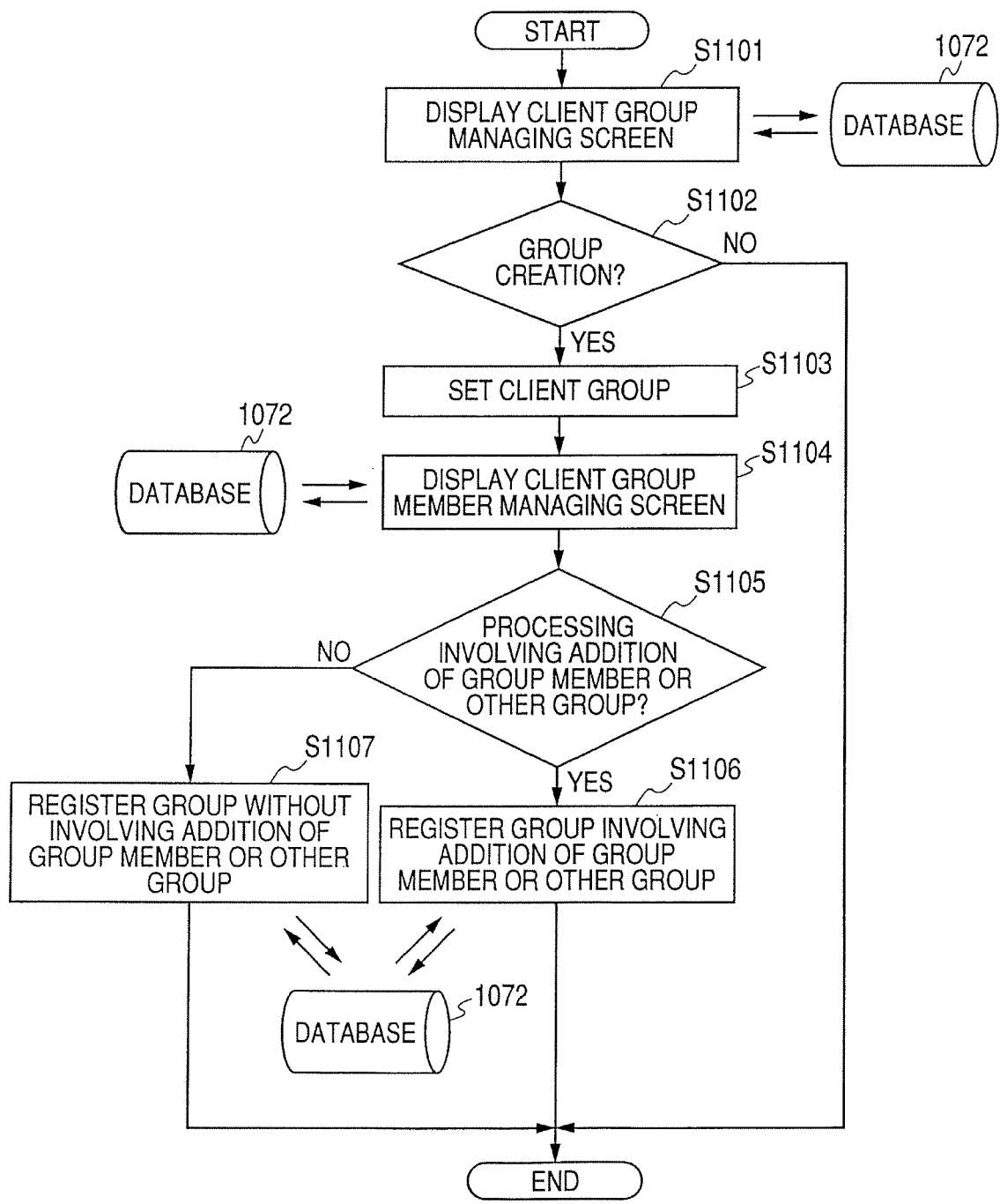
FIG. 11 is a flowchart illustrating an example of a third data processing procedure in the server apparatus illustrating the embodiment.

FIG. 11 is a flowchart illustrating an example of a third data processing procedure in the server apparatus illustrating the embodiment. The example is corresponding to a detailed procedure of the client register processing at S44 illustrated in FIG. 4. Each of the reference codes S1101 to S1107 denotes each step. Each step is implemented as the CPU of the client 2100, which is a PC for administrator, loads the control program to the RAM and executes the program.

In the processing, the second display unit 2010 and the second input unit 2020 of the client 2100, which is a PC for administrator, illustrated in FIG. 1 access the first driver control unit 1071 of the server 1000 via the Web application. Accordingly, the processing is executed by the first driver control unit 1071 of the server 100.

First at S1101, the first driver control unit 1071 accesses the first information management DB 1072 displays the client group managing screen illustrated in FIG. 12, for example, which is registered at the first information management DB 1072, on the second display unit 2010.

FIG. 12 is a diagram illustrating an example of a user interface screen displayed on the second display unit 2010 illustrated in FIG. 2. This is an example of the client registering screen. Each column and each button on the screen will be described below. The screen is made up with two panes. The screen is adapted to be able to be displayed on the second display unit 2010 of the client 2100 when the client 2100 obtains the Web information from the server 1000 via the Web application.

In FIG. 12, [Driver Database] tree view TV is control for displaying drivers registered at the first information management DB 1072 in a form of tree.

[Client Group Settings] is displayed in the right pane, with control for creating a client group and adding a client to belong displayed.

[Client Group Name] edit box EBOX1 is a box for setting a group name to be newly added to a location selected in [Driver Database] tree view TV.

[Client Group Path] Edit box EBOX2 is a box for displaying the location selected in [Driver Database] tree view TV.

[Next] button BT11 is a button to be pressed for the purpose of instructing to transfer to the next processing step. [Cancel] button BT12 is a button to be pressed for the purpose of invalidating the processing on the screen and instructing to move to a predetermined UI.

As illustrated in FIG. 12, the present group information is displayed in the form of the <Client Database> tree view TV with <Client Group Settings> displayed in the right pane in the example.

The example in FIG. 12 means that the user interface has an existing group <1F> as a parent and is about to create <area 11-team A> anew under the parent. The example corresponds the case in which the former is displayed as "Client Group Path" and the latter is displayed as "Client Group Name".

Under the state at S1102, the first driver control unit 1071 determines whether it is group creation or not based on whether [Next] button BT11 is pressed down or not. If the first driver control unit 1071 determines that the group creation is not indicated, the operation ends.

If the first driver control unit 1071 determines that the group creation is indicated at S1102, the operation proceeds to S1103, where the first information management DB 1072 is accessed and client group setting processing starts.

If the first driver control unit 1071 determines that the group creation is not indicated at S1102, for example, if

[Cancel] buttons BT3, BT12 are pressed on the user interface screen illustrated in FIG. 12 and FIG. 13, the operation ends.

Then at S1104, the first driver control unit 1071 accesses the first information management DB 1072, and the client group member managing screen as illustrated in FIG. 13 is displayed on the second display unit 2010.

FIG. 13 is a diagram illustrating an example of the user interface screen displayed on the second display unit 2100 illustrated in FIG. 2. The screen is made up with two panes. The screen is adapted to be able to be displayed on the second display unit 2010 of the client 2100 when the client 2100 obtains the Web information from the server 1000 via the Web application.

This is an example of a client group member managing screen. The screen provides a function involving processing of determining whether a group member or an existing group is to be added to the client group to be created or not.

Each column and each button on the screen will be described below.

In FIG. 13, [Client Database] tree view TV displays the client group registered at the first information management DB 1072 in a form of tree.

In the right pane, existing client groups are displayed for [Client Group] M1 and existing clients are displayed for [Clients] M2. The right pane is adapted so that the displayed client and client groups can be selected in response to the pressing of [Select] buttons SB1 to SB3 and SB11 to SB14, respectively.

In the example, [Client Group Settings] M3 corresponds to the state in which a client <ClientPC_01> is registered at a new client group <area11-team A>M31.

That is, this is an example of 'area11-team A' is set in [Selected Group] edit box EBOX1.

[Group Path] edit box EBOX2 is a box for displaying a location [\1F\] selected in [Diver Database] tree view TV.

Then at S1105, the first driver control unit 1071 determines whether the processing involves adding processing of a group member or the other group or not. If the first driver control unit 1071 determines that the processing involves adding processing of a group member or the other group, for example if [Add] button BT1 is pressed on the user interface screen illustrated in FIG. 13, the operation proceeds to S1106.

At S1106, the first driver control unit 1071 performs register processing of the client group involving the adding processing of the group member or the other group on the first information management DB 1072, and the operation ends.

In the example, the adding processing of the client group means pressing of [Add] button in FIG. 13.

If the first driver control unit 1071 determines that the processing does not involve adding of the group member or the other group at S1105, for example if the first driver control unit 1071 determines that the processing is a creation of only the client group, the operation proceeds to S1107. Then at S1107, the first driver control unit 1071 performs group registration without involving adding of the group member or the other group on the first information management DB 1072, and the operation ends.

[Task Processing-Agent Task Creating & Register Processing]

Figure 14:
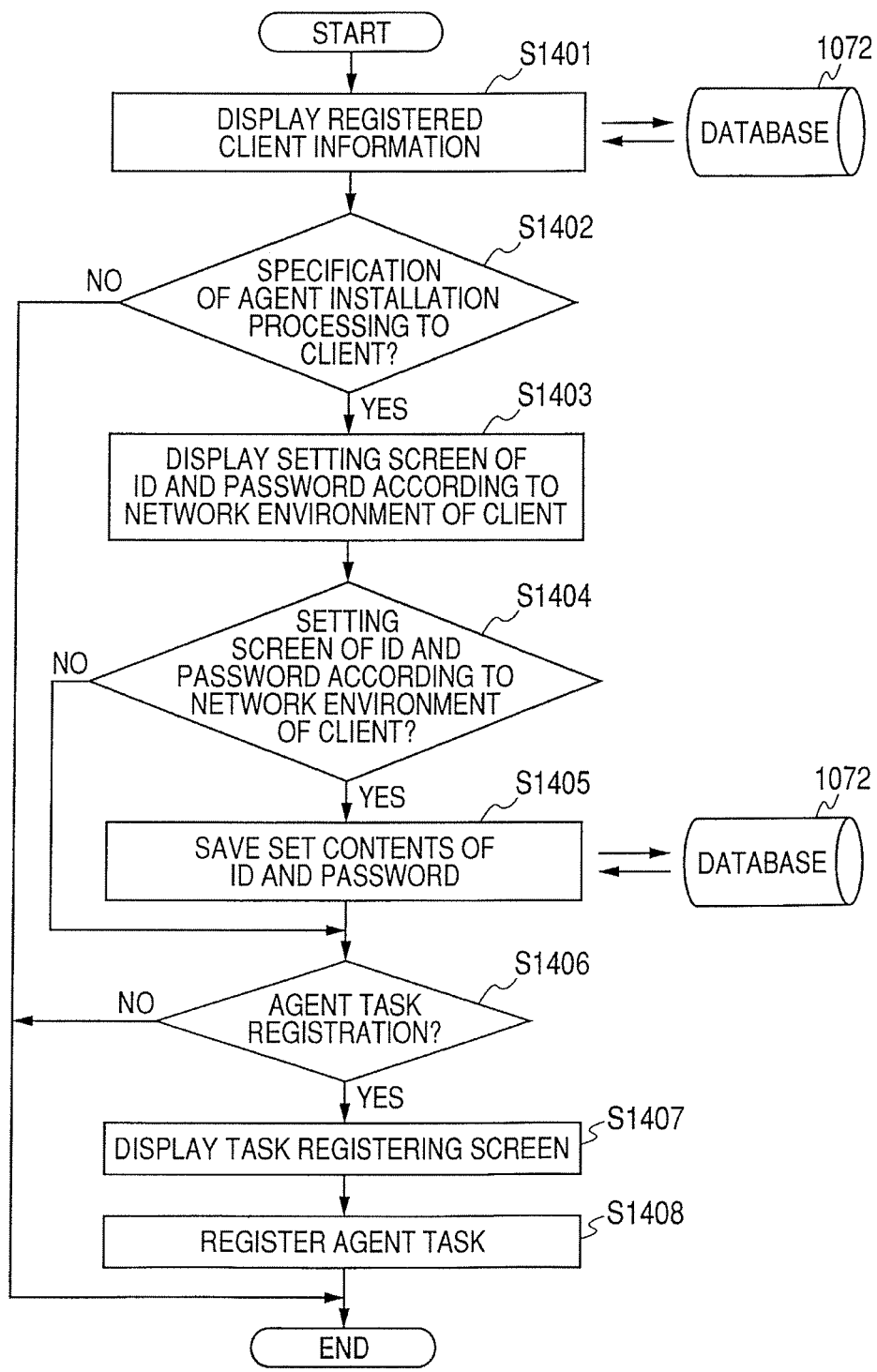
FIG. 14 is a flowchart illustrating an example of a fourth data processing procedure in the server apparatus illustrating the embodiment.

FIG. 14 is a flowchart illustrating an example of a fourth data processing procedure in the server apparatus illustrating the embodiment. The example corresponds to the detailed procedure of the Agent task processing at S47 illustrated in FIG. 4. Each of the reference codes S1401 to S1408 denotes each step. Each step can be implemented as the CPU of the client 2100, which is a PC for an administrator, loads a control program to the RAM and executes the program. The processing is for the second display unit 2010 and the second input unit 2020 of the client 2100 of the PC for an administrator illustrated in FIG. 1 to access the first driver control unit 1071 of the server 1000 via the Web application. Then, the processing is executed by the first driver control unit 1071 of the server 100.

First at S1401, the first driver control unit 1071 accesses the first information management DB 1072 and displays the client list registered at the first information management DB 1072 on the second display unit 2010.

FIG. 15 is a diagram illustrating an example of a user interface screen displayed on the second display unit 2010 illustrated in FIG. 2. This is an example of client list screen. The screen is made up with a pane. The screen is adapted to be able to be displayed on the second display unit 2010 of the client 2100 when the client 2100 obtains the Web information from the server 1000 via the Web application.

In FIG. 15, [Select] column C151 is a column for setting a selecting control on whether or not to make the client to be registered of the Agent.

[Computer Name] column C152 is a column indicating the list of physically present clients searched in advance by the server 1000.

[OS] column C153 is a column indicating the operating system loaded to the client. [Network] column C154 is a column indicating information on the network environment to which the client belongs. In the example, Domain or Workgroup is described here.

[Domain/Workgroup] column C155 is a column indicating an actual name against the attribute of [Network] column C154. In the example, a domain name against Domain and a work group name against Workgroup are illustrated.

[ID] column C156 is a column indicating ID of Domain for the Domain environment or ID with Admin authority of the client for the Workgroup. [Password] column C157 is a column indicating a password corresponding to [ID] column C156.

[Status] column C158 is a column indicating whether ID and Password has been set in the first information management DB 1072 or not.

[Next] button BT11 is a control button that means transferring to the next processing step. [Cancel] button BT12 is a control button for invalidating the processing on the screen and moving to a predetermined UI.

For example, ClientPC_01 has Windows (registered trademark) 2000 series installed as its OS and placed in a domain environment as domain 01. ClientPC_01 displays that the ID of the domain is AII, that Password has been registered at the first information management DB 1072 and the Agent has not been installed yet.

Then at S1402, the first driver control unit 1071 determines whether the Agent installation processing on the client is specified or not. Specifically, it is determined whether some client is selected and [Next] button BT11 is pressed or not based on the registered client information as in the above-mentioned manner.

If the first driver control unit 1071 determines that the Agent installation processing on the client is not specified, the operation ends.

If the first driver control unit 1071 determines that the Agent installation processing on the client is specified at S1402, ID and Password setting screen illustrated in FIG. 16 is displayed at S1403.

FIG. 16 is a diagram illustrating an example of the user interface screen displayed on the second display unit 2010 illustrated in FIG. 2. This is an example of setting screen of ID and Password. Two sections and respective columns and buttons will be described below.

The screen is adapted to be able to be displayed on the second display unit 2010 of the client 2100 when the client 2100 obtains the Web information from the server 1000 via the Web application.

In FIG. 16, [Domain] section SC1 is a section for setting ID and Password of the domain environment. [Domain] section C161 is a section indicating the domain name. [ID] section C162 is a section indicating ID of the domain.

[Password] section SC163 is a section indicating Password against the ID.

[Workgroup Members] section SC2 is a list of clients under the Workgroup environment and a section for setting ID and Password with the Admin authority for each client.

In [Workgroup Members] section SC2, [ClientName] section SC164 is a section indicating a client name under the Workgroup environment. [OS] section SC165 is a section indicating the operating system of the client.

[Workgroup] section SC166 is a section indicating a name of Workgroup on which the client places. [ID] section SC167 is a section indicating ID of Admin authority of the client. [Password] section SC168 is a section indicating Password for the ID.

[Next] button BT11 is a control button for transferring to the next registering screen. [Cancel] button BT12 is a control button for invalidating the processing on the screen and moving to a predetermined UI.

Return to the description of the processing illustrated in FIG. 14. At S1404, the first driver control unit 1071 determines whether ID and Password according to the network environment of the client is to be set or not. If the first drier control unit 1071 determines that ID and Password is not to be set, the operation proceeds to S1406.

If the first driver control unit 1071 determines that ID and Password according to the network environment of the client is to be set at S1404, the operation proceeds to S1405. Then at S1405, the first driver control unit 1071 saves the set ID and Password in the first information management DB 1072 on the screen illustrated in FIG. 16.

Then at S1406, the first driver control unit 1071 determines whether or not to register it as the Agent task. Specifically, the first driver control unit 1071 determines based on whether [Next] button BT11 or [Cancel] button BT12 illustrated in FIG. 16 is pressed.

It the first driver control unit 1071 determines that [Next] button BT11 is pressed, the operation proceeds to S1407 where a task registering screen for registering it as the Agent task illustrating an example in FIG. 17 is displayed on the second display unit 2010. If the first driver control unit 1071 determines that [Cancel] button BT12 is pressed, the operation ends.

FIG. 17 is a diagram illustrating an example of the user interface screen displayed on the second display unit 2010 illustrated in FIG. 2. This is an example of a task registering screen. One section and each column and each button will be described below. The screen is made up with a pane. The screen is adapted to be able to be displayed on the second display unit 2010 of the client 2100 when the client 2100 obtains the Web information from the server 1000 via the Web application.

In FIG. 17, [Task Registration Settings] section SC3 is a section illustrating registration of the Agent task. [Task Name] column C171 is a section illustrating a name of a task to be registered at a scheduler. [Schedule] column C172 is a section for setting whether or not to execute the task immediately, to execute the task at a scheduled date and time or to only register the task. [Schedule] column C172 is for selecting from 'Immediate execution' S1, 'Executionat specific date' S2 and 'Only registration' S3.

[Register] button BT171 is a control button for registering at the scheduler to be described later. [Cancel] button BT172 is a control button for invalidating the processing on the screen and moving to a predetermined UI.

In the example, the task name is <Agent Installation 001>, which is scheduled to be executed at <2005/1/1 13:00:00>.

Then [Register] button BT171 is pressed and the operation proceeds to S1408, where the schedule set in the scheduler controlled by the first driver control unit 1071 is registered, and the operation ends.

Here, the scheduler is a function for the first driver control unit 1071 of the server 1000 to execute for the purpose of collectively managing the tasks created in the above-mentioned procedure and registered at the first storage 1060. It is a matter of course that the scheduler is a general one for generating an event for the first driver control unit 1071 according to the set operation mode.

Here, the operation mode corresponds to [Immediate execution] S1, [Execution at specific date] S2 in [Schedule] column C172 illustrated in FIG. 17.

(Installation Processing-Agent Task Executing Processing)

FIG. 18 is a flowchart illustrating an example of a fifth data processing procedure in the server apparatus illustrating the embodiment. This example corresponds to the detailed procedure of Agent installation processing corresponding to S48 and S49 if the request is determined as a request for installation at S41 illustrated in FIG. 4. Each of the reference codes S1801 to S1808 denotes each step. Each step can be implemented as the CPU of the client 2100, which is a PC for an administrator, loads a control program to the RAM and executes the program.

First at S1801, the first driver control unit 1071 accesses the first information management DB 1072 for administrator ID and Password of the target client and performs obtain processing. Then at S1802, the first driver control unit 1071 determines whether the administrator ID and Password can be obtained or not. If the first information management DB 1072 determines that the administrator ID and Password cannot be obtained, the operation ends.

If the first information management DB 1072 determines that the administrator ID and Password can be obtained at S1802, the operation proceeds to S1803.

Then at S1803, the first driver control unit 1071 attaches the obtained administrator ID and Password to the installer for an Agent. At S1804, the installer for an Agent is sent from the server 1000 to the client. The installer for an Agent is sent in such a way as the WMI (Management Instrumentation in Windows (registered trademark), for example.)

At S1805, the first driver control unit 1071 obtains the administrator ID and Password from the installer for an Agent. Next at S1806, the client 2100 logs in the client by using the obtained administrator ID and Password. At S1807, it is determined whether it can be logged in or not. If it is determined that the client cannot be logged in, the operation ends.

If it is determined that the client can be logged in by using the obtained administrator ID and Password at S1807, the operation proceeds to S1808. At S1808, the first driver control unit 1071 installs the Agent installer to the client by the administrator authority, and the operation ends.

[Associate Processing Between a Driver and a Device]

Figure 19:
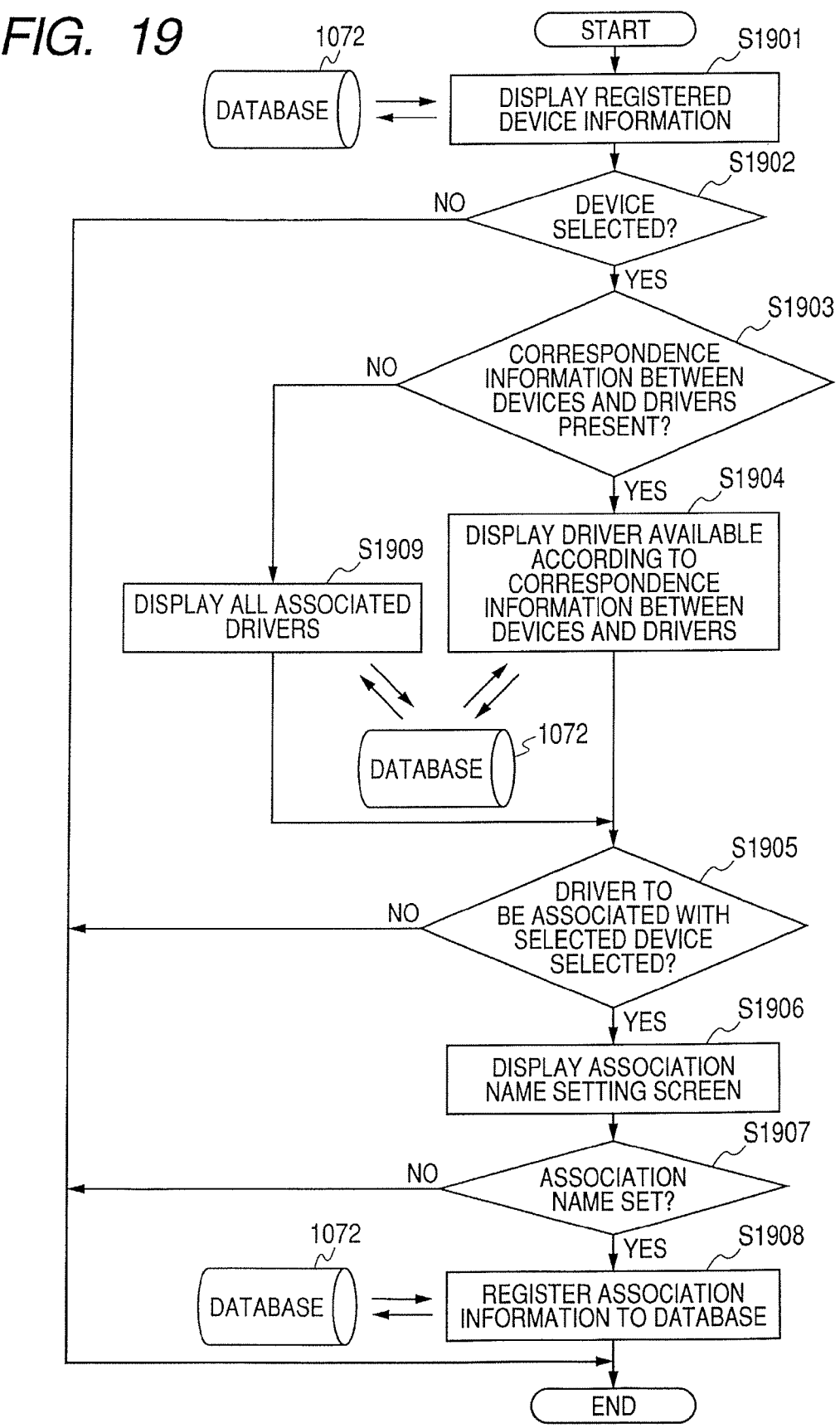
FIG. 19 is a flowchart illustrating an example of a sixth data processing procedure in the server apparatus illustrating the embodiment.

FIG. 19 is a flowchart illustrating an example of a sixth data processing procedure in the server apparatus illustrating the embodiment. The example corresponds to the detailed procedure of associate processing between the driver and device at S45, which is executed when it is determined as associate processing. Each of the reference codes S1901 to S1909 denotes each step. Each step can be implemented as the CPU of the client 2100, which is a PC for an administrator, loads a control program to the RAM and executes the program. In the processing, the first driver control unit 1071 of the server 1000 is accessed by the second display unit 2010 and the second input unit 2020 of the client 2100, which is the PC for administrator, illustrated in FIG. 1 via the Web application. That is the processing for the first driver control unit 1071 of the server 100.

First at S1901, the first driver control unit 1071 accesses the first information management DB 1072 and displays the device list screen illustrated in FIG. 20 registered at the first information management DB 1072, for example, on the second display unit 2010.

FIG. 20 is a diagram illustrating an example of a user interface screen displayed on the second display unit 2010 illustrated in FIG. 2. This is an example of device list screen. One section and each column and each button will be described below. The screen is adapted to be able to be displayed on the second display unit 2010 of the client 2100 when the client 2100 obtains the Web information from the server 1000 via the Web application.

In FIG. 20, [Device Database] section tree view TV is a tree for displaying the result of the grouping processing performed on the device searched in the server 1000 in advance in the TreeView form.

In the example, a state in which device groups such as <1F>, <area11>, <area12>, <area13>, <2F>, <area 21>, <area 22> have already been present is illustrated.

[Devices] section SC201 is a section, in which a list of devices belonging to a group is displayed, when the group is selected in [Device Database] section tree view TV.

[Select] column C2100 in [Devices] section SC201 is a section where selection on whether it will be a device to be associated with the driver or not is done. [Device Name] column C2002 is a column indicating a list of devices belonging to the selected group in [Device Database] section tree view TV.

[IP Address] column C2003 is a column indicating the IP address assigned to the device. [Location] column C2004 is a column indicating information on the location of the device.

[PDL] column C2005 is a column indicating the PDL installed to the device. [Language] column C2006 is a column indicating a language operating in the device. [misc] column C2007 is a column indicating information influencing the selection of the driver.

In the example, <FAX> is written in some lines, which means that a facsimile function installed to the device is available from a client with a driver in the same method as that used in the printer drier such as a facsimile driver. That is, <FAX> shows information for determining whether the facsimile driver is to be installed to the client as the printer driver is or not.

The column is also for displaying the information that triggers selecting a driver other than that mentioned above when the same driver has different drivers for respective paper ejecting functions.

[Next] button BT11 is a control button for implementing transfer to the next registering screen. [Cancel] button BT12 is a control button for invalidating the processing on the screen and moving to a predetermined UI.

Then at S1902, the first driver control unit 1071 determines whether a device is selected or not. If it is determined that any device is not selected, the operation ends.

If the first driver control unit 1071 determines that a device is selected, the operation proceeds to S1903. If it is determined that a device is selected in [Select] column C2001 and [Next] button BT11 is pressed in FIG. 20 for example, the operation proceeds to S1903.

Then at S1903, the first driver control unit 1071 determines whether the association information between the selected device and driver is present or not. If the first driver control unit 1071 determines that the association information between devices and drivers is present, the operation proceeds to S1904. At S1904, the first driver control unit 1071 accesses the first information management DB 1072 for available drivers with the association information between devices and drivers, and displays such a list of drivers as illustrated in FIG. 21 on the second display unit 2010.

FIG. 21 is a diagram illustrating an example of a user interface screen displayed on the second display unit 2010 illustrated in FIG. 2. This is an example of a driver list screen. One section and each column and each button will be described below.

The screen is adapted to be able to be displayed on the second display unit 2010 of the client 2100 when the client 2100 obtains the Web information from the server 1000 via the Web application.

In FIG. 21, [Select] column C2101 is a column for implementing selection of drivers to be associated with devices. [Driver Name] column C2102 is a column indicating a list of drivers which can be associated with a device, i.e., a list of drivers available in the device.

[PDL] column C2103 is a column indicating information indicating whether the driver corresponds to any PDL or not. [Version] column C2104 is a column indicating version information on the driver. [OS] column C2105 is a column indicating information indicating the OS of what the driver is corresponding to.

[Language] column C2106 is a column indicating the corresponding language of the driver.

[Next] button BT11 is a control button for implementing transfer to the next registering screen. [Cancel] button BT12 is a control button for invalidating the processing on the screen and moving to a predetermined UI.

Those mentioned above means that the device selected on the screen illustrated in FIG. 20 and the driver selected on the screen illustrated in FIG. 21 are associated with each other.

Then at S1905, the first driver control unit 1071 determines whether the associated drier is selected for the selected device or not. If it is determined that no driver is selected for the device selected by the first driver control unit 1071 to be associated with, the operation ends.

If it is determined that a driver is selected for the device selected by the first driver control unit 1071 to be associated with at S1905, the operation proceeds to S1906. At S1906, the first driver control unit 1071 displays an association name setting screen illustrated in FIG. 22 on the second display unit 2010.

FIG. 22 is a diagram illustrating an example of a user interface screen displayed on the second display unit 2010 illustrated in FIG. 2. This is an example of an association name setting screen. One section, each column and each button will be described below.

The screen is adapted to be able to be displayed on the second display unit 2010 of the client 2100 when the client 2100 obtains the Web information from the server 1000 via the Web application.

In FIG. 22, [Association Name] column C2201 is a column indicating information that can be edited like an edit box for setting an association name. [Target Device Name] column C2202 is a column indicating an associated device name.

[Driver to Use] column C2203 is a column indicating an associated driver name. [Register] button BT221 is a control button for implementing registration at a scheduler.

[Cancel] button BT222 is a control button for invalidating the processing on the screen and implementing a move to a predetermined UI.

Then at S1907, the first driver control unit 1071 determines whether association name setting is performed on FIG. 22 or not. If the first driver control unit 1071 determines that association name setting is not performed, the operation ends.

If the first driver control unit 1071 determines that the association name setting is performed on FIG. 22 at S1907, the operation proceeds to S1908.

In the example, two driver sets are associated with the device <Device-A>. Specifically, as illustrated in FIG. 22, they are the two drivers <PS Driver-A v12.00 for W2K for US> and <PS Driver-A v12.00 for W9x for US>.

Finally at S1908, the first driver control unit 1071 registers the association information illustrated in FIG. 22 in the first information management DB 1072, and the operation ends.

If the first driver control unit 1071 determines that the association information between devices and drivers is not present at S1903, the operation proceeds to S1909, where drivers that are out of the association information are displayed, and the operation proceeds to S1905.

An example of displaying association information when two driver sets are associated with the device <Device-A> is illustrated in FIG. 23.

FIG. 23 is a diagram illustrating an example of a user interface screen displayed on the second display unit 2010 illustrated in FIG. 2. This is an example of an association result screen. One section and each column and each button will be described below.

The screen is adapted to be able to be displayed on the second display unit 2010 of the client 2100 when the client 2100 obtains the Web information from the server 1000 via the Web application.

In FIG. 23, [Association Information] section SC231 is a section indicating a list of association between devices and drivers.

[Association Name] column C2301 is a column that lists the association names set in [Association Name] column C2201 illustrated in FIG. 22.

[Device Name] column C2302 is a column indicating an associated device. [PDL] column C2303 is a column indicating a PDL of the associated driver.

[OS] column C2304 is a column indicating an OS corresponding to the associated driver. [Language] column C2305 is a column indicating a corresponding destination of the associated driver. [misc] column C2306 is a column indicating additional information of the associated driver.

In the example, <FAX> is written in some lines, which means that the associated driver is a facsimile driver instead of a printer driver.

If no device is selected at S1902, or if it is determined that the association name is not set at S1907, the operation ends. Similarly, if [Cancel] button BT11 is pressed in FIG. 20 and FIG. 21 or if [Cancel] button BT221 is pressed in FIG. 22, the operation ends.

[Task Processing-Driver Installation Task Creation & Register Processing]

Figure 24:
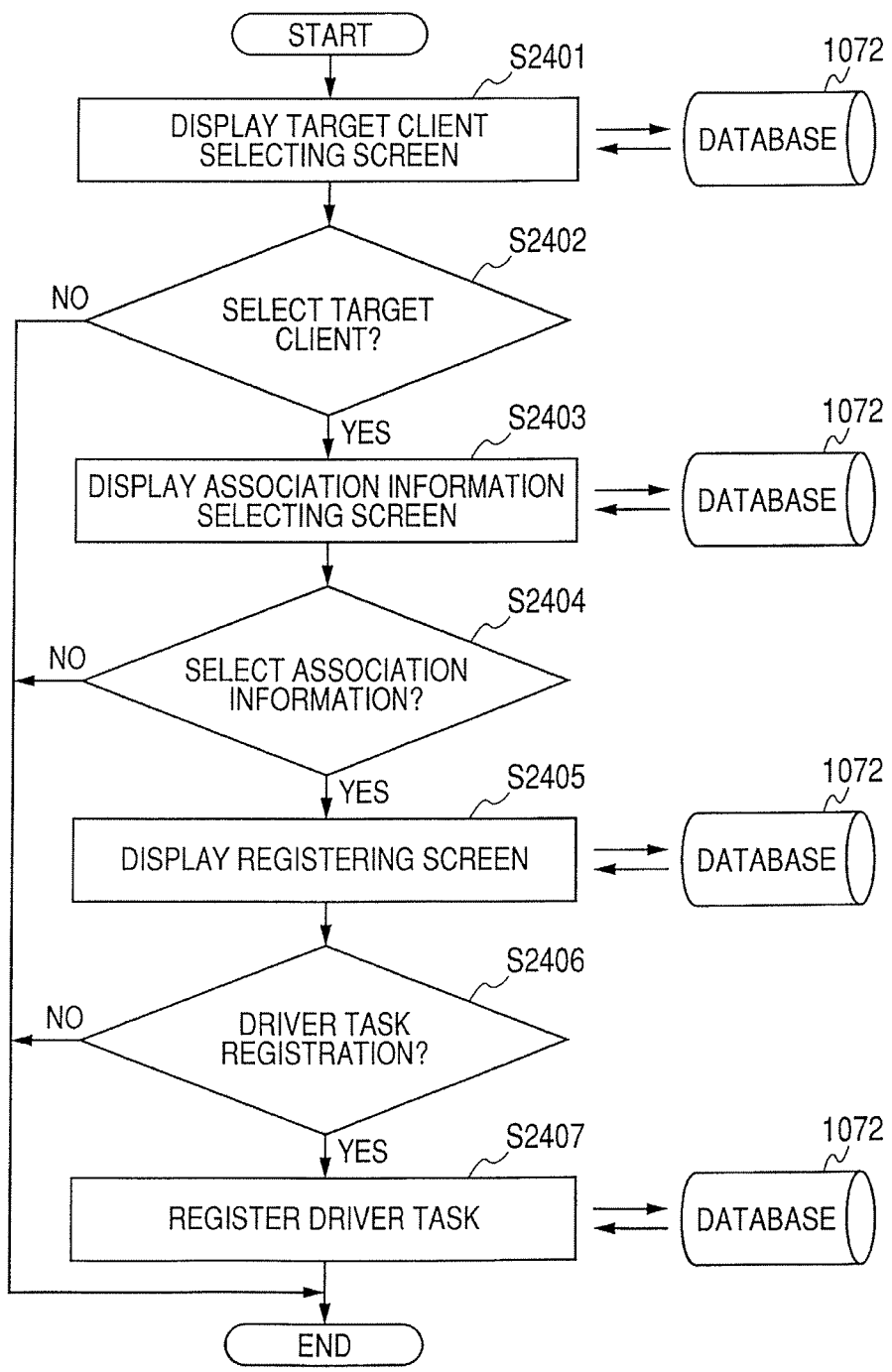
FIG. 24 is a flowchart illustrating an example of a seventh data processing procedure in the server apparatus illustrating the embodiment.

FIG. 24 is a flowchart illustrating an example of a seventh data processing procedure in the server apparatus illustrating the embodiment. This example corresponds to the detailed procedure of the driver task processing at S48 that is executed when it is determined as the driver task processing at S46 illustrated in FIG. 4. Each of the reference codes S2401 to S2407 denotes each step. Each step can be implemented as the CPU of the client 2100, which is a PC for an administrator, loads a control program to the RAM and executes the program.

Figure 25:
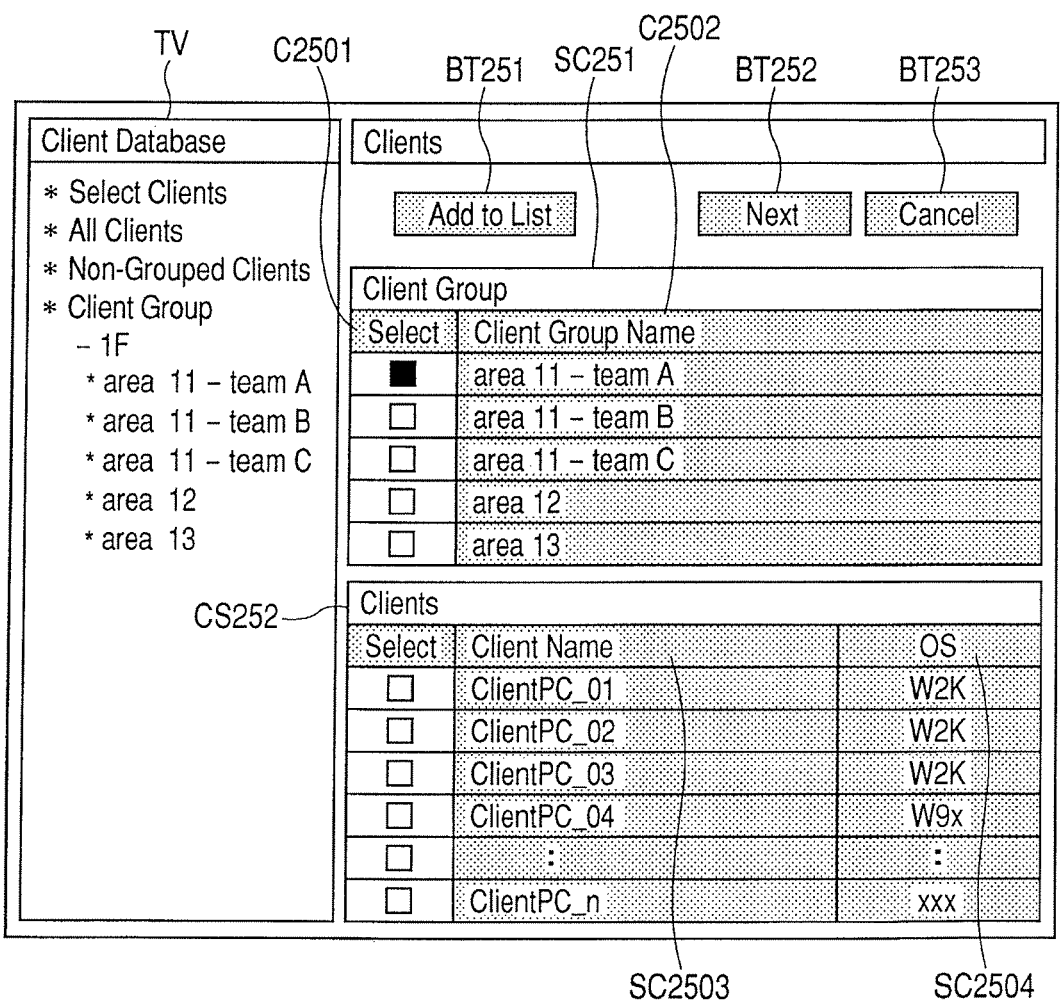
FIG. 25 is a diagram illustrating an example of a user interface screen displayed on the second display unit illustrated in FIG. 2.

First at S2401, the first driver control unit 1071 accesses the first information management DB 1072 and displays the client selecting screen illustrated in FIG. 25, for example, which is for selecting a registered client on the second display unit 2010.

FIG. 25 is a diagram illustrating an example of a user interface screen displayed on the second display unit 2010 illustrated in FIG. 2. This is an example of the client registering screen. One section and each column and each button will be described below.

The screen is adapted to be able to be displayed on the second display unit 2010 of the client 2100 when the client 2100 obtains the Web information from the server 1000 via the Web application.

In FIG. 25, [Client Database] tree view TV displays the selected client registered at the first information management DB 1072 in a tree form. This tree view TV is a tree for making a client to be installed selected by the unit of group.

[Client Group] section SC251 is a section for implementing display and selection on clients belonging to the client group selected in [Client Database] tree view TV.

[Clients] section SC252 is a section for implementing display and selection on clients belonging to the client group selected in [Client Group] section.

[Select] column S2501 is a column for implementing selection on clients to install a driver by the unit of client group in [Client Group] section SC251. The driver is a driver for using any of the devices illustrated in FIG. 1 with the same function but sometimes with different languages or OS versions.

[Clients] section SC252 is a section for implementing selection by the unit of client.

[Client Group Name] column C2502 is a column indicating a client group list. [Client Name] column C2503 is a column indicating a client list. [OS] column C2504 is a column indicating an operating system of the client.

[Next] button BT252 is a button for instructing to transfer to the next processing step. [Cancel] button BT253 is a button for invalidating the processing on the screen and moving to a predetermined UI.

[Add to List] button BT251 is a button for instructing to register at the list.

Next at S2402, the first driver control unit 1071 determines whether the target client is selected or not. If the first driver control unit 1071 determines that the target client is not selected, the operation ends.

If the first driver control unit 1071 determines that the target client is selected at S2401, the operation proceeds to S2403. Then at S2403, the first driver control unit 1071 accesses the first information management DB 1072 and displays a selecting screen for selecting association between devices and drivers illustrated in FIG. 26 on the second display unit 2010.

FIG. 26 is a diagram illustrating an example of a user interface screen displayed on the second display unit 2010 illustrated in FIG. 2. This is an example of a selecting screen for selecting association between devices and drivers. One section and each column and each button will be described.

The screen is adapted to be able to be displayed on the second display unit 2010 of the client 2100 when the client 2100 obtains the Web information from the server 1000 via the Web application.

In FIG. 26, [Association Information] selection 261 is a section for illustrating a list for associating devices and drivers.

[Select] column C2601 is a column indicating a device selected to be associated with. [Association Name] column C2602 is a column listing the association names set in [Association Name] column C2201 illustrated in FIG. 22.

[Device Name] column C2603 is a column indicating associated devices. [PDL] column C2604 is a column indicating PDL of the associated driver. [OS] column S2605 is a column indicating a corresponding OS of the associated driver.

[Language] column C2606 is a column indicating a corresponding destination of the associated driver. [misc] column C2607 is a column indicating additional information of the associated driver.

In the example, <FAX> is written in some lines, which corresponds to the state in which the associated driver is a facsimile driver instead of a printer driver.

[OK] button BT262 is a control button for implementing transfer to the next registering screen. [Delete] button BT261 is a button for controlling to delete the selected device.

Then at S2404, the first driver control unit 1071 determines whether the association information displayed on the screen illustrated in FIG. 26 is selected or not in response to pressing of [OK] button BT262 or not. If the first driver control unit 1071 determines that [OK] button BT262 is not pressed and the association information displayed on the screen illustrated in FIG. 26 is not selected, the operation ends.

If the first driver control unit 1071 determines that the association information displayed on the screen illustrated in FIG. 26 is selected at S2404, the operation proceeds to S2405. Then at S2405, the first driver control unit 1071 accesses the first information management DB 1072 and displays a screen for registering the task of listing association between devices and drivers illustrated in FIG. 27 on the second display unit 2010.

Figure 27:
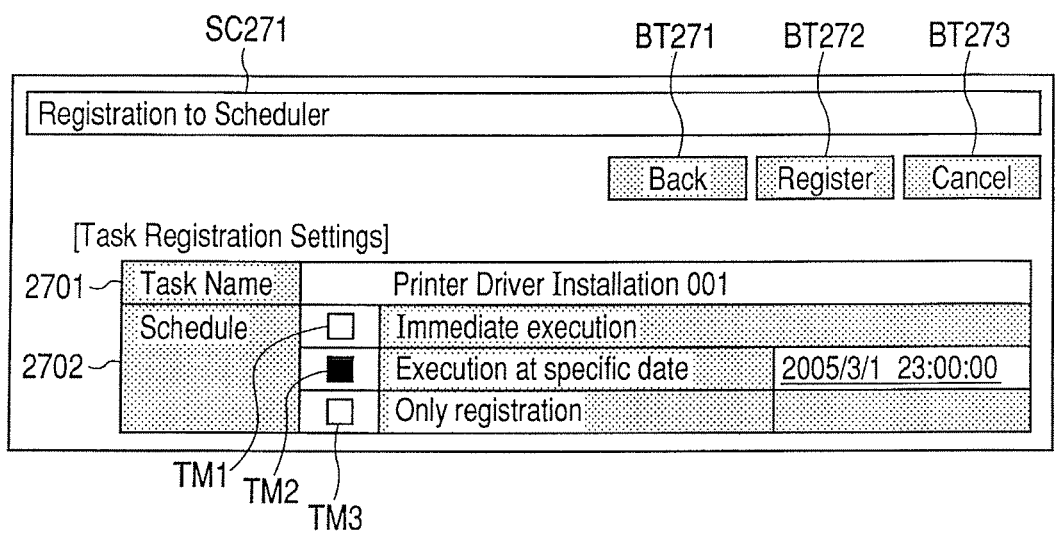
FIG. 27 is a diagram illustrating an example of a user interface screen displayed on the second display unit illustrated in FIG. 2.

FIG. 27 is a diagram illustrating an example of a user interface screen displayed on the second display unit 2010 illustrated in FIG. 2. This is an example of a screen for registering the task of listing association between devices and drivers. One section and each column and each button will be described below.

The screen is adapted to be able to be displayed on the second display unit 2010 of the client 2100 when the client 2100 obtains the Web information from the server 1000 via the Web application.

In FIG. 27, [Task Registration Settings] section SC271 is a section for registering a driver installation task.

[Task Name] column S2701 is a column indicating a name of a task to be registered at the scheduler. Here, the scheduler is for executing the same function as that of the scheduler described in the register processing of the Agent task.

[Schedule] column S2702 is a column for deciding whether or not to execute the task immediately, to execute the task at a scheduled date and time or to only register the task.

In the embodiment, any of [Immediate execution] TM1, [Execution at specific date] TM2 and [Only registration] TM3 is selected.

[Register] button BT272 is a registering button for indicating that displayed contents are registered in the scheduler.

[Cancel] button BT273 is a button for indicating to invalidate the processing on the screen and move to a predetermined UI. [Back] button BT271 is a button for indicating to return to a previous state.

In the example, the task name is <Printer Driver Installation 001>, corresponding to the state in which the task is executed at <2005/3/1 13:00:00>. Accordingly, Printer Driver Installation 001 is installed at the time <2005/3/1 13:00:00> based on a scheduler function of the first driver control unit 1071 of the server 1000. Specifically, the server 1000 installs the printer driver to Client Group selected in [Client Group] section SC251 that is selected on the screen illustrated in FIG. 25.

Then at S2406, it is determined whether a driver task register processing is requested as [Register] button BT272 is pressed on the screen illustrated in FIG. 27 or not. If the first driver control unit 1071 determines that [Register] button BT272 is not pressed, the operation ends.

If the first driver control unit 1071 determines that [Register] button B272 is pressed at S2406, the operation proceeds to S2407. Then at S2407, the first driver control unit 1071 registers installation processing of a printer driver to control at the scheduler, and the operation ends.

The scheduler is a general scheduler that generates an event to the first driver control unit 1071 according to the set operation mode and for collectively managing the tasks. The operation mode corresponds to a time element for deciding an install timing of the printer driver like [Immediate execution] and [Execution at specific date].

[Installation Processing-Driver Installation Task Executing Processing]

Figure 28:
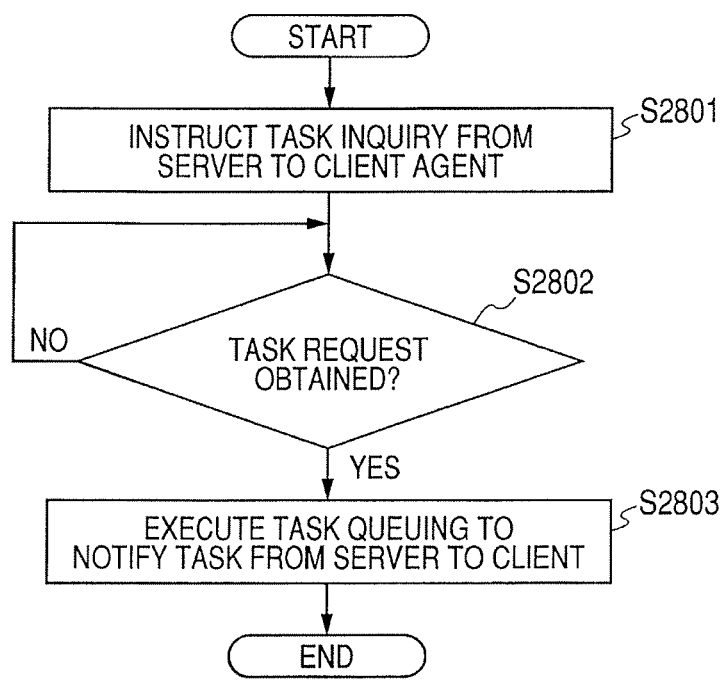
FIG. 28 is a flowchart illustrating an example of an eighth data processing procedure in the server apparatus illustrating the embodiment.

FIG. 28 is a flowchart illustrating an example of an eighth data processing procedure in the server apparatus illustrating the embodiment. This example corresponds to the detailed procedure of installation processing at S50 that is executed as it is determined as the installation processing at S41 illustrated in FIG. 4 and also it is determined as a request for installing a driver to a client at S48.

Each of the reference codes S2801 to S2803 denotes each step. Each step can be implemented as the CPU of the client 2100, which is a PC for an administrator, loads a control program to the RAM and executes the program. The server 1000 and the client 2100 exchange information in such a general way as the Web service.

First at S2801, the first driver control unit 1071 instructs to request from the server 1000 to inquire for a task to an Agent of the client 2100. The Agent is installed from the server 1000 to the client in the previous Agent task processing at S47 illustrated in FIG. 4.

Then at S2802, the Agent of the client issues a request for a task of whether a task is present or not to the server 1000. Then, the first driver control unit 1071 obtains the request for a task from the client.

Next at S2803, the server 1000 sends the task to a queue kept in the Agent of the client for the Agent of the client, and the operation ends. Here, the client is the clients 2200, 2400 and 2500 illustrated in FIG. 1. The client is also a client selected in a group selected in generating an install task of the printer driver on the screen illustrated in FIG. 25.

Figure 29:
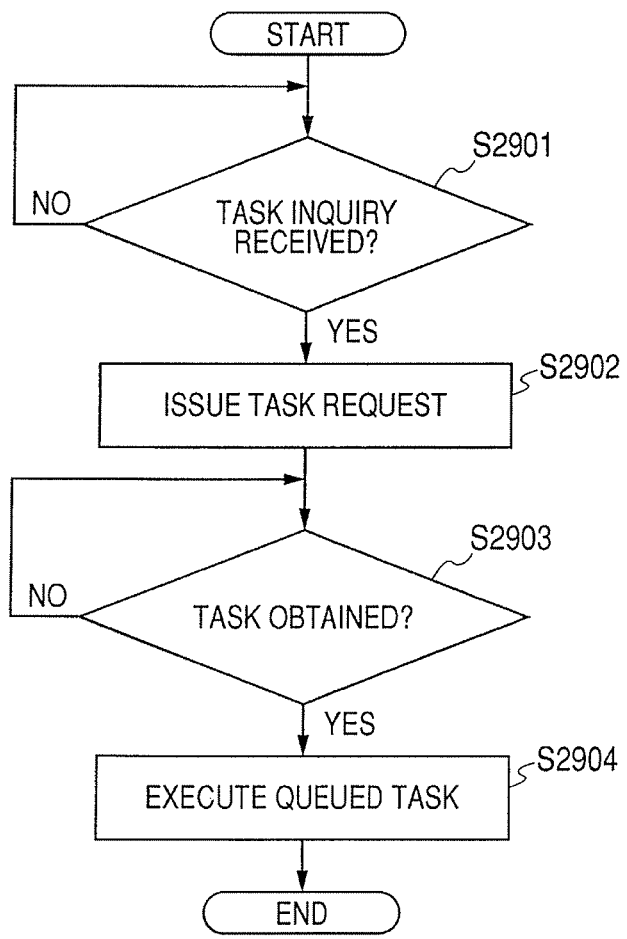
FIG. 29 is a flowchart illustrating an example of the first data processing procedure in the information processing unit illustrating the embodiment.

FIG. 29 is a flowchart illustrating an example of the first data processing procedure in the information processing unit illustrating the embodiment. This example is the task processing at the client side involved with the task executing processing from the server 1000 illustrated in FIG. 28. Each of the reference codes S2901 to S2904 denotes each step. Each step can be implemented as the CPU of the client 2100 loads a control program to the RAM and executes the program.

First at S2901, the Agent of the client is waiting for receiving an inquiry for a task from the server 1000. When the Agent of the client receives the inquiry for the task, the Agent issues a request for a task of determining whether a task destined to the Agent or not to the server 1000 at S2902. Then at S2903, the second driver control unit 2071 of the client is waiting for that the task sent to the Agent of the client is obtained by the queue at S2903. When the queue obtains the task, the second driver control unit 2071 keeps the task.

Then at S2904, the Agent of the client refers to the queue manage by the Agent and executes the installation task of the driver in order, and then the operation ends.

In the embodiment, an adding task to be installed in the device driver and a deleting task for deleting an installed device driver are described as exemplary tasks. In addition, the first driver control unit 1071 of the server 1000 can also execute an updating task for updating an installed device.

[Second Embodiment]

The arrangement of the data processing programs that can be read by the information processing unit and server apparatus illustrating the embodiment will be described with reference to memory maps illustrated in FIG. 30 and FIG. 31.

FIG. 30 is a diagram describing a memory map of a storage medium that stores various data processing programs which can be read by the information processing unit according to the present invention.

Figure 31:
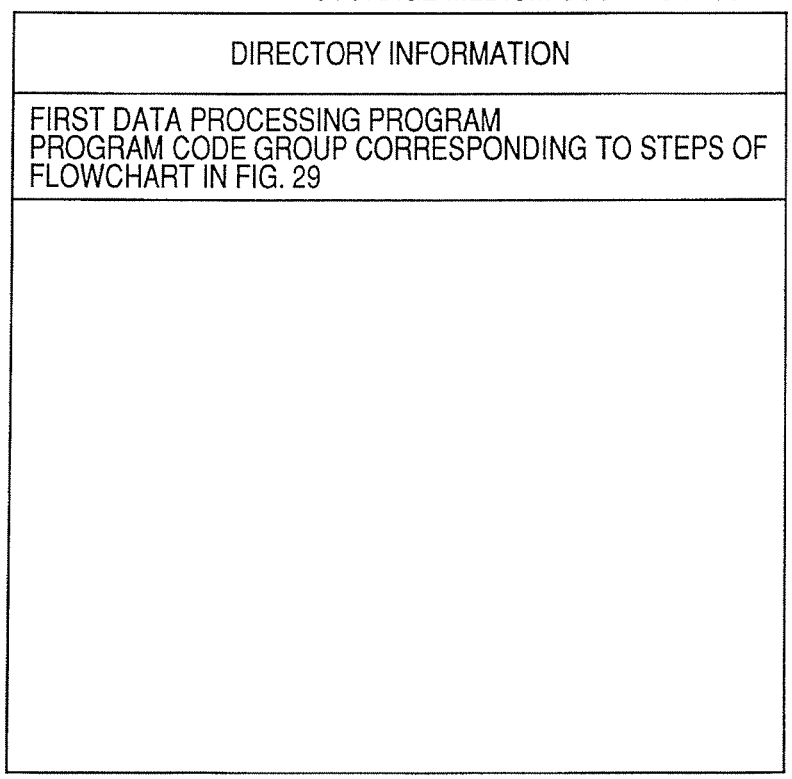
FIG. 31 is a diagram describing a memory map of a storage medium that stores various data processing programs which can be read by the server apparatus according to the present invention.

FIG. 31 is a diagram describing a memory map of a storage medium that stores various data processing programs which can be read by the server apparatus according to the present invention.

Although not illustrated in the drawings, information for managing a group of programs stored in a storage medium, for example, version information, creators and the like may be stored and information depending on the OS at a program reading side, for example an icon for identifying and displaying a program may be stored.

Data belonging to various programs are also managed in the above-mentioned directories. If the program for installing the various programs to a computer or a program to be installed is compressed, a program for decompressing the program may also be stored.

The functions illustrated in FIGS. 4, 7, 11, 14, 18, 19, 24, 28 and 29 in the embodiment may be executed in the host computer by programs installed from outside. In such a case, the present invention is applied even in the case in which a group of pieces of information including programs are supplied on a storage medium such as a CD-ROM, a flush memory or a FD, or from an external storage medium via a network to the output apparatus.

As mentioned above, a storage medium recording a program code of software for implementing the functions of the above-mentioned embodiment is supplied to the system or apparatus. It is a matter of course that the object of the present invention is achieved even in the case in which the computer (or the CPU or the MPU) of the system or the apparatus reads out the program code stored in the storage medium and executes it.

In such a case, the program code itself read out from the storage medium implements the new function of the present invention. Therefore, the storage medium storing the program code forms the present invention.

A program in any form like an object code, a program executed by an interpreter and script data to be supplied to the OS may be used in the present invention if only it has a function of program.

As a storage medium for supplying a program, a flexible disk, a hard disk, an optical disk, a magneto-optical disk, an MO, a CD-ROM, a CD-R, a CD-RW, a magnetic tape, a nonvolatile memory card, a ROM, a DVD, for example, may be used.

In such a case, the program code itself read out from the storage medium implements the above-mentioned functions of the embodiment. Therefore, the storage medium storing the program code forms the present invention.

As a method for supplying a program, it is assumed that the program may be supplied in such a manner as connecting with a homepage on the Internet with a browser of the client computer, and then downloading the computer program of the present invention or a compressed file including an automatic installing function from the homepage to the storage medium like a hard disk. The method for supplying a program may also be implemented in such a manner as dividing the program code forming the program of the present invention into a plurality of files and downloading each file from different homepages. That is, it is assumed that claims of the present invention include the WWW server and the ftp server that let a plurality of users download the program file for implementing the function processing of the present invention on a computer.

It can also be assumed that the method for supplying a program is also implemented in such a manner as encrypting the program of the present invention, storing the program in a storage medium like a CD-ROM and distributing the program to users so that the users having fulfilled predetermined conditions are allowed to download key information for decrypting the encryption from the homepage via the Internet, and further allowing the users to install the encrypted program in a computer by using the key information.

The above-mentioned function of the embodiment may not only be implemented as the program code read by the computer is executed. It is a matter of course that the above-mentioned function of the embodiment can also be implemented in such a manner as the OS (operating system) running on the computer executes all or a part of the actual processing based on instructions of the program codes, for example, so that the function is implemented according to the processing.

It is also a matter of course that the above-mentioned function of the embodiment can also be implemented in such a manner as the program code read out from the storage medium is written in the memory provided for the feature expansion board inserted in the computer or the feature expansion unit connected to the computer, and then a CPU provided for the feature expansion board or the feature expansion unit executes all or a part of the actual processing based on the instruction of the program code so that the function is implemented according to the processing.

The present invention is not limited to the above-mentioned embodiments, and various modifications (including organic combinations of various embodiments) can be implemented based on the spirit of the present invention without being departed from the scope of the present invention.

Although the present invention has been described by taking various examples and embodiments of the present invention, it is apparent to those skilled in the art that the spirit and the scope of the present invention are not limited to any particular descriptions in the specification.

The embodiments can provide a system that can reduce workload for each client apparatus installing a device driver that enables any device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-036113, filed Feb. 16, 2007, which is hereby incorporated by reference herein in its entirety.

What is claimed is:

1. A server apparatus that communicates with a plurality of client apparatuses and a plurality of devices connected on a network, said server apparatus comprising:
   a registration unit constructed to, when a request for driver management is input, register, in a database, driver information of a device driver to be installed in one of the plurality of clients, wherein, when the device driver is already provided with correspondence information on a correspondence between the device driver and device information of one of the plurality of devices, the registration unit registers the correspondence information together with the driver information;
   a storage unit constructed to, when a request for associating a device driver with a device is input, store, in the database, (a) association information between device information of a predetermined one of the plurality of devices and driver information of a device driver designated by selection for the association for the predetermined device, and (b) association name information set to the association information, wherein, if the correspondence information for the predetermined device is registered in the database, the selection for the association for the predetermined device is made from a list of device drivers having the correspondence information matching the device information of the predetermined device from among the device drivers registered in the database, and, if the correspondence information for the predetermined device is not registered in the database, the selection for the association for the predetermined device is made from a list of the device drivers registered in the database;
   a generating unit constructed to generate a plurality of types of tasks, wherein the tasks include an adding task for additionally installing a device driver to any of the client apparatuses, and an agent install task for installing an agent used for installing the device driver to any of the client apparatuses based on the adding task;
   an executing unit constructed to control execution of the tasks generated by the generating unit;
   an agent transmission unit constructed to transmit an agent installer to one of the client apparatuses that corresponds to the generated agent install task in accordance with the execution of the generated agent install task controlled by the executing unit; and
   a task transmission unit constructed to transmit information on the generated adding task so that the agent manages the information in a queue of the agent,
   wherein the generating unit generates the adding task for additionally installing a device driver that supports the predetermined device based on a selection from a list formed using the association information and the association name information stored by the storage unit, and
   wherein the device driver corresponding to the adding task is installed by the execution of the adding task managed in the queue of the agent.

2. The server apparatus according to claim 1, wherein the plurality of types of tasks generated by the generating unit further include a deleting task for deleting a device driver installed in any of the client apparatuses, and an updating task for updating a device driver installed in any of the client apparatuses.

3. The server apparatus according to claim 1, wherein the device driver is a printer driver for controlling a printer device connected with the network.

4. The server apparatus according to claim 1, further comprising a setting unit constructed to set an ID with administrator authority and a password for the plurality of client apparatuses,
   wherein the agent installer is attached with the ID with administrator authority and the password for a client apparatus set by the setting unit.

5. The server apparatus according to claim 1, wherein, in the event that the adding task has been generated a timing when a task request is obtained from the agent of the client apparatus, the driver transmission unit transmits the device driver to the client apparatus, so that the device driver is installed in the client apparatus in accordance with the adding task.

6. The server apparatus according to claim 1, further comprising a creating unit constructed to create a schedule for executing the tasks generated by the generating unit, wherein the executing unit is constructed to control execution of the tasks generated by the generating unit based on the schedule created by the creating unit.

7. The server apparatus according to claim 1, further comprising a request unit constructed to request the agent installed in the client apparatus by the agent installer to send an inquiry for a task to the server apparatus, in accordance with the execution of the generated adding task controlled by the executing unit, wherein the task transmission unit is constructed to transmit the information in response to the inquiry from the agent.

8. A driver processing method in a server apparatus that communicates with a plurality of client apparatuses and a plurality of devices connected on a network, said method comprising:
   registering driver information of a device driver to be installed in one of the plurality of clients in a database, when a request for driver management is input, wherein, when the device driver is already provided with correspondence information on a correspondence between the device driver and device information of one of the plurality of devices, the correspondence information is registered together with the driver information;
   storing, in the database, when a request for associating a device driver with a device is input, (a) association information between device information of a predetermined one of the plurality of devices and driver information of a device driver designated by selection for the association for the predetermined device, and (b) association name information set to the association information, wherein, if the correspondence information for the predetermined device is registered in the database, the selection for the association for the predetermined device is made from a list of device drivers having the correspondence information matching the device information of the predetermined device from among the device drivers registered in the database, and, if the correspondence information for the predetermined device is not registered in the database, the selection for the association for the predetermined device is made from a list of the device drivers registered in the database;
   generating a plurality of types of tasks, wherein the tasks include an adding task for additionally installing a device driver to any of the client apparatuses, and an agent install task for installing an agent used for installing the device driver to any of the client apparatuses based on the adding task;

controlling execution of the tasks generated by the generating step;

transmitting an agent installer to one of the client apparatuses that corresponds to the generated agent install task in accordance with the execution of the generated agent install task controlled by the controlling step; and transmitting information on the generated adding task so that the agent manages the information in a queue of the agent wherein the generating step generates the adding task for additionally installing a device driver that supports the predetermined device based on a selection from a list formed using the association information and the association name information stored in the storage step, and wherein the device driver corresponding to the adding task is installed by the execution of the adding task managed in the queue of the agent.

9. The driver processing method according to claim 8, wherein the plurality of types of tasks generated in said generating step further include a deleting task for deleting a device driver installed in any of the client apparatuses, and an updating task for updating a device driver installed in any of the client apparatuses.

10. The driver processing method according to claim 8, wherein the device driver is a printer driver for controlling a printer device connected with the network.

11. A non-transitory computer readable storage medium that stores a program for causing a computer to execute the driver processing method according to claim 8.

12. The driver processing method according to claim 8, further comprising setting an ID with administrator authority and a password for the plurality of client apparatuses, wherein the agent installer is attached with the ID with administrator authority and the password for a client apparatus set by the setting step.

13. The driver processing method according to claim 8, wherein, in the event that the adding task has been generated at a timing when a task request is obtained from the agent of the client apparatus, the device driver is transmitted to the client apparatus, so that the device driver is installed in the client apparatus in accordance with the adding task.

* * * * *